(12) United States Patent
Moon et al.

(10) Patent No.: US 11,781,764 B2
(45) Date of Patent: Oct. 10, 2023

(54) AIR PURIFYING SYSTEM

(71) Applicant: NuWave, LLC, Libertyville, IL (US)

(72) Inventors: Jung S. Moon, Long Grove, IL (US);
Byung Gab Choi, Lake Villa, IL (US);
James Moon, Vernon Hills, IL (US);
Zeng Qing Ping, Shanwei (CN); Kim Jong Rok, Seoul (KR); Luo Fei, Foshan (CN)

(73) Assignee: NuWave, LLC, Vernon Hills, IL (US)

( * ) Notice: Subject to any disclaimer, the term of this patent is extended or adjusted under 35 U.S.C. 154(b) by 753 days.

(21) Appl. No.: 16/575,635

(22) Filed: Sep. 19, 2019

(65) Prior Publication Data

US 2020/0094177 A1 Mar. 26, 2020

Related U.S. Application Data

(60) Provisional application No. 62/733,168, filed on Sep. 19, 2018.

(51) Int. Cl.
| | |
|---|---|
| *F24F 8/10* | (2021.01) |
| *B01D 36/02* | (2006.01) |
| *B01D 35/06* | (2006.01) |
| *B01D 46/46* | (2006.01) |
| *F24F 8/167* | (2021.01) |
| *F24F 8/158* | (2021.01) |
| *F24F 8/108* | (2021.01) |

(52) U.S. Cl.
CPC ............... *F24F 8/10* (2021.01); *B01D 35/06* (2013.01); *B01D 36/02* (2013.01); *B01D 46/46* (2013.01); *F24F 8/108* (2021.01); *F24F 8/158* (2021.01); *F24F 8/167* (2021.01); *B01D 2255/00* (2013.01)

(58) Field of Classification Search
CPC .. F24F 1/0071; F24F 13/28; F24F 8/10; F24F 8/108; F24F 8/158; F24F 8/167; F24F 8/192; F24F 2110/50; F24F 11/39; F24F 11/526; F24F 11/61; F24F 11/52; B01D 36/02; B01D 35/06; B01D 46/46; B01D 2255/00; Y02B 30/70
See application file for complete search history.

(56) References Cited

U.S. PATENT DOCUMENTS

| | | | |
|---|---|---|---|
| 2005/0268583 A1* | 12/2005 | Han | B01D 46/10 55/471 |
| 2015/0306533 A1* | 10/2015 | Matlin | F24F 3/16 96/417 |

FOREIGN PATENT DOCUMENTS

| | | | | |
|---|---|---|---|---|
| CN | 105864916 A | * | 8/2016 | ............. F24F 13/06 |
| CN | 107975878 A | * | 5/2018 | ............. F24F 13/20 |

* cited by examiner

*Primary Examiner* — Waqaas Ali
(74) *Attorney, Agent, or Firm* — Bishop, Diehl & Lee, Ltd.

(57) ABSTRACT

An air purifying system having a series of specific filters stacked to facilitate removal of particles from the air. Removable filters include a pre-filter, a HEPA electrostatic filter, an activated carbon filter and a cold catalyst filter. Additional filters or alternate filters may be used, so long as there is no negative impact on the system efficiency and effectiveness.

13 Claims, 25 Drawing Sheets

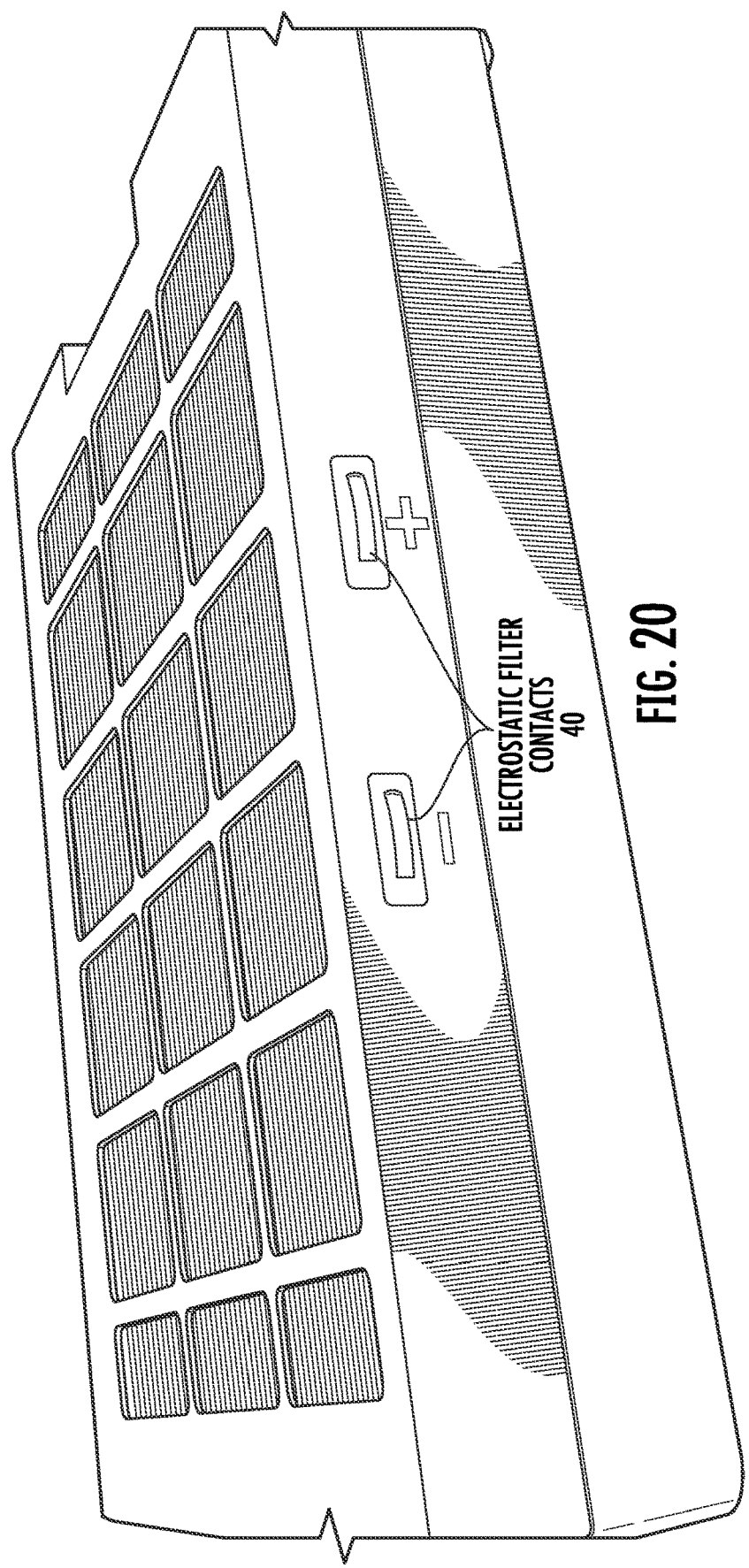

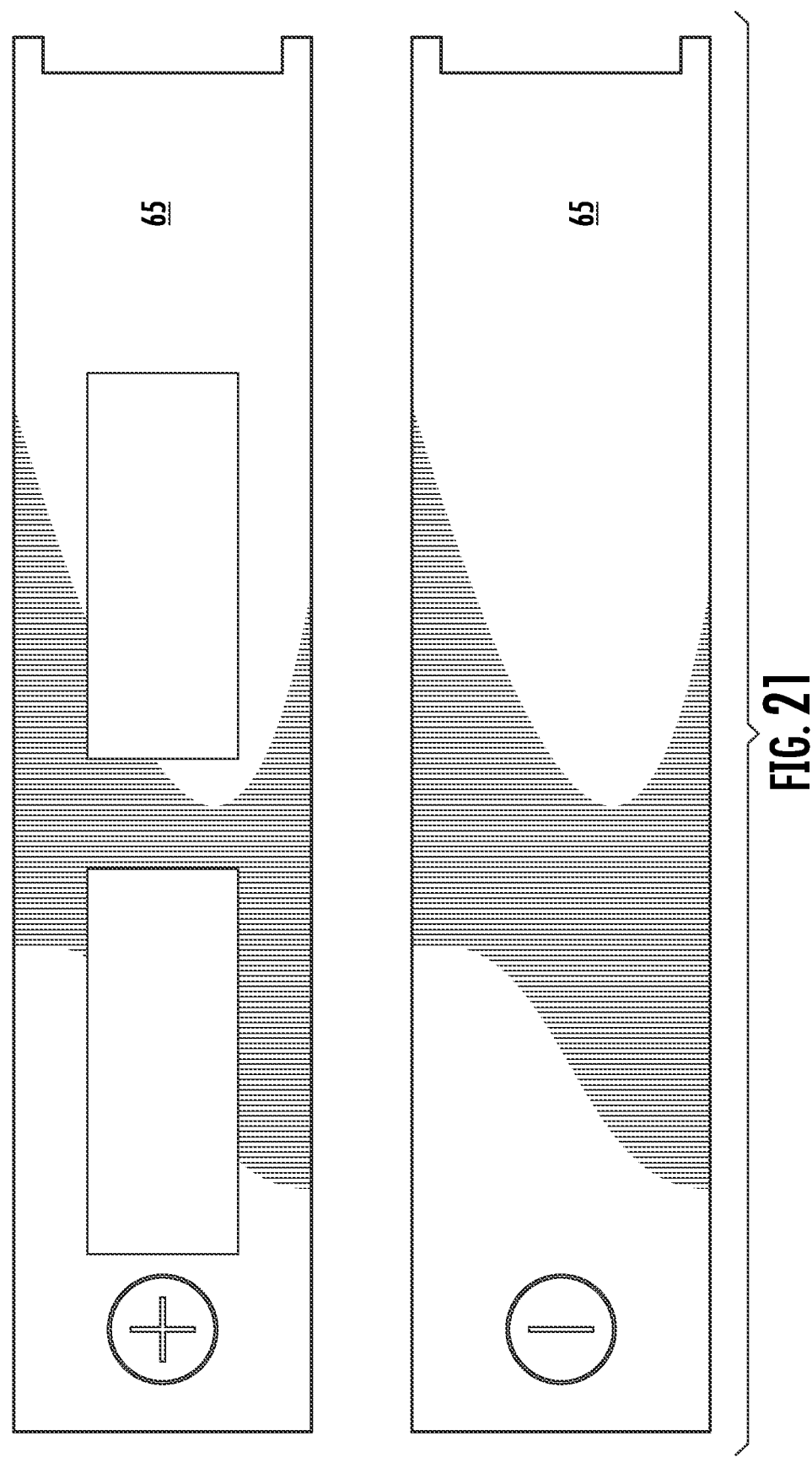

AIR PURIFYING SYSTEM

RELATED APPLICATION

The present disclosure claims the filing priority of U.S. Provisional Application No. 62/733,168, titled "AIR PURIFYING SYSTEM" and filed on Sep. 19, 2018. The '168 application is hereby incorporated by reference.

TECHNICAL FIELD OF THE INVENTION

The present application relates to air purifying systems. Particularly, the application relates to an improved programmable, electrostatic air purifier which removes smoke, dust, pollen, bacterial and other particulate matter from air.

BACKGROUND OF THE INVENTION

As is well known to those skilled in the art, an air purifier is used to provide purified clean air after removing contaminants. The air purifier is provided with a collecting unit to collect contaminants. In the collecting unit, particles electrically charged by corona discharge of an ionizer are collected by electrostatic attraction of an electrostatic filter having a polarity opposite to the polarity of the newly charged particles.

As shown in FIG. 1, a conventional air purifier includes a pre-filter 102, an ionizer 104, an electrostatic filter 106 and a final filter 108. The pre-filter 102 acts primarily to filter relatively large particles, while the ionizer 104 functions to charge smaller particles electrically to have a positive polarity. This is done by corona discharge between a discharge electrode 104b and ground electrodes 104a positioned on both sides of the discharge electrode 104b. The electrostatic filter 106 has a plurality of horizontal partitions 106a bearing a negative polarity. When the positively charged particles flow between the horizontal partitions 106a of the electrostatic filter 106, the particles are adsorbed and collected on the negatively charged horizontal partitions by electrostatic attraction. The final filter 108 functions to filter fine dust or bacteria not filtered by the electrostatic filter 106.

As set by the U.S. Department of Energy, High-Efficiency Particulate Air, or HEPA, filtering systems must be effective for removing 99.97% of all particles having a size of 0.3 micron or larger from the air (See U.S. Federal Standard MIL-F-51068). Even greater efficiency can be found in some HEPA filters, which are rated by class as shown in the TABLE below:

TABLE

| HEPA Class | Effective Particle Removal |
| --- | --- |
| H13 | >99.95% |
| H14 | >99.995% |
| U15 | >99.9995% |
| U16 | >99.99995% |
| U17 | >99.999995% |

However, the efficiency will decrease as the filter and collecting unit become too dirty. In most cases, the filters are easily replaceable, but the collecting unit may be more difficult to clean in prior art systems.

These and other problems are addressed by the present device and methods to provide a system with numerous advantages in operation and effectiveness.

SUMMARY OF THE INVENTION

There is disclosed herein an improved air purifying system which avoids the disadvantages of prior devices while affording additional structural and operating advantages.

Generally speaking, the air purifying system comprises an outer housing having a control panel, an air inlet and an air outlet, a filter chamber positioned within the outer housing and comprising a series of filters, and a fan positioned within the outer housing, electrically coupled to the control panel and configured to draw air into the air inlet, through the filter chamber and then push the air out through the air outlet. Specifically, the series of filters comprises at least one of each a pre-filter, an electrostatic filter, an activated carbon filter, and a cold catalyst filter.

In a specific embodiment, the air inlet comprises air openings in a 360° circumference about a base of the housing.

Further, the air purifying system removes over 99% of airborne dust particles, smoke particles and VOCs from the air moving through the series of filters. Specifically, the pre-filter, electrostatic filter, activated carbon filter and cold catalyst filter are stacked in order from bottom to top in the filter chamber.

In specific embodiments, the air purifying system is pre-programmed with operational modes which facilitate efficiency by alerting for poor air quality, filter cleaning or removal alerts, and automatic on and off modes.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings, embodiments and other aspects thereof, from an inspection of which, when considered in connection with the following description, the subject matter sought to be protected, its construction and operation, and many of its advantages should be readily understood and appreciated.

FIGS. 17-20 are several views of an embodiment of an electrostatic collection unit, including a plurality of partitions; and FIG. 21 shows opposing sides of two strips from the electrostatic filter of FIG. 17.

DETAILED DESCRIPTION OF PREFERRED EMBODIMENTS

Figure 1:
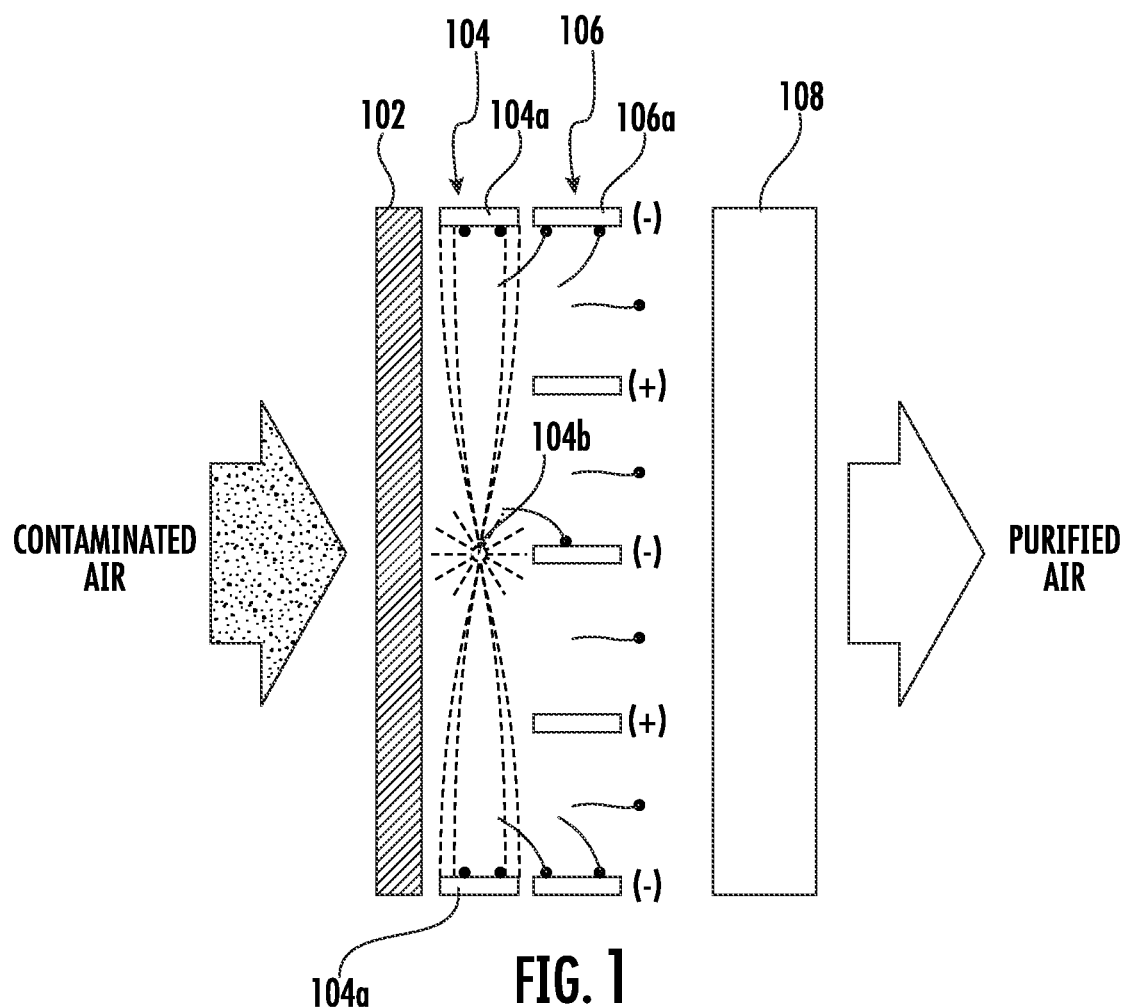
FIG. 1 is a schematic showing the general structure and operation of an electrostatic air purifying system.
Figure 2:
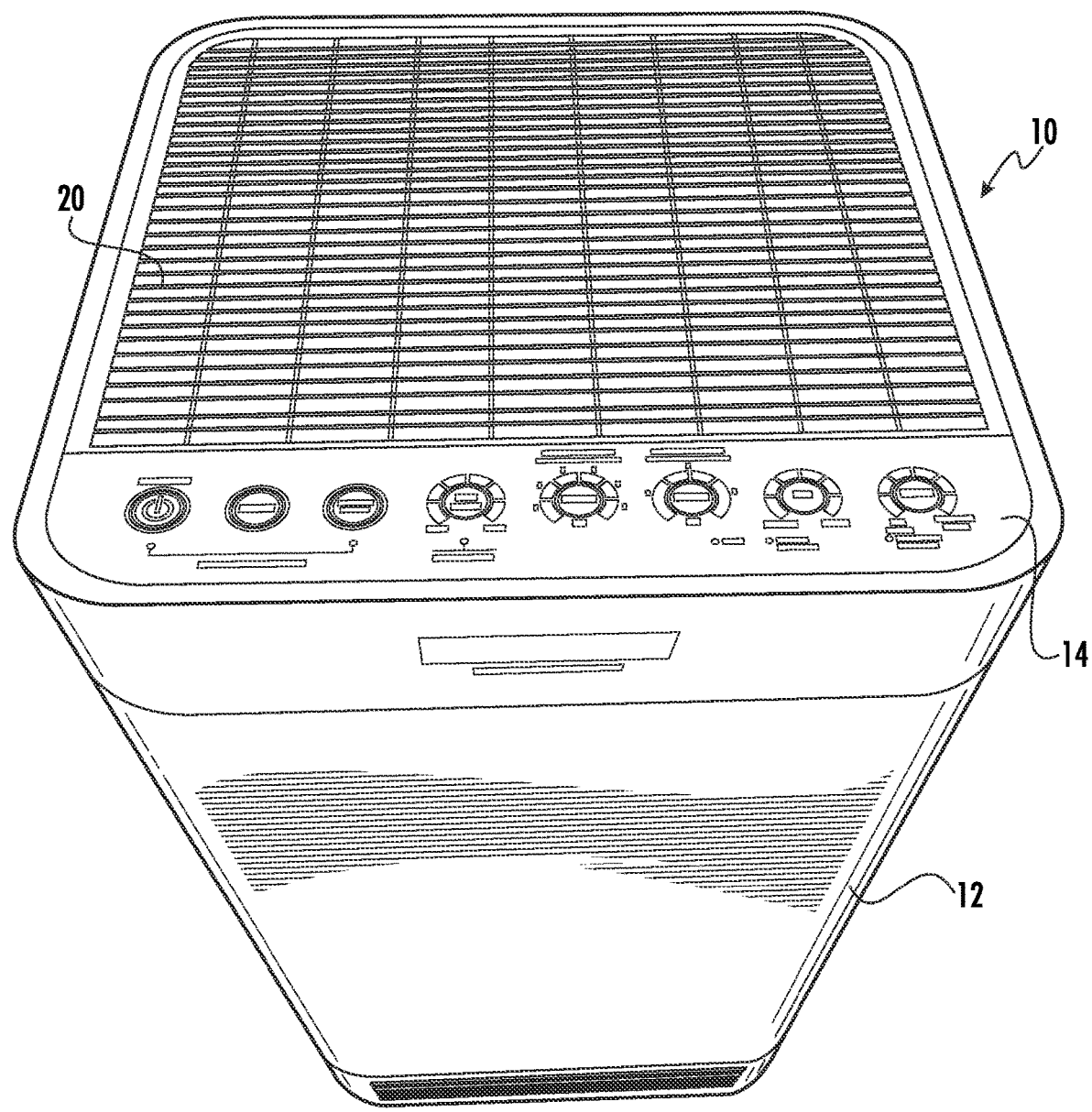
FIG. 2 is a front perspective on an embodiment of the disclosed air purifying system.
Figure 3:
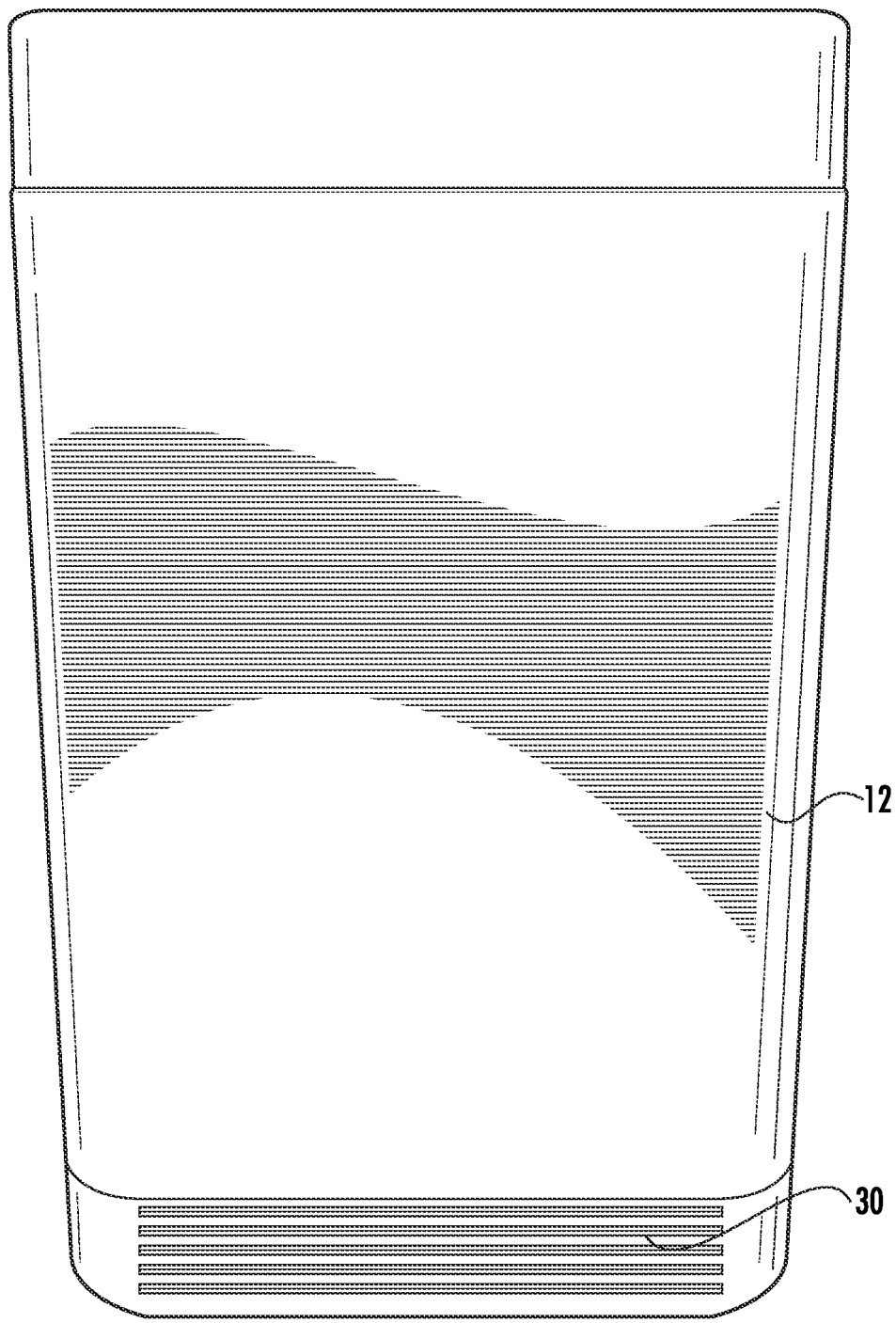
FIG. 3 is a front view of the embodiment of FIG. 2.

While this invention is susceptible of embodiments in many different forms, there is shown in the drawings, appended documents and tables, at least one embodiment will herein be described in detail with an understanding that the present disclosure is to be considered as an exemplification of the principles of the invention and is not intended to limit the broad aspect of the invention to any specific embodiments illustrated or described.

Referring to FIGS. 1-21, there is illustrated at least one preferred embodiment of an air purifier system, generally designated by the numeral 10, and its several components. The particular illustrated air purifier system or purifier 10 is portable and for a home or small office space. However, modification can be made to the disclosed embodiments to provide a smaller, larger or fixed system, if desired.

Referring specifically now to FIGS. 2-6, embodiments of the purifier housing 12 are shown, including a preferred control panel 14 on a front edge of the top surface 20. Handles 22 are provided on the sides for lifting or moving the purifier 10, and a removable rear panel 24 conceals a filter chamber 26. Below the rear panel 24 and on all sides of the purifier 10 are air intake vents 30. This 360° intake helps maximize the air purification process. The top surface 20 of the purifier 10 includes an air discharge vent 32 comprised of a substantially open area, covered by a plurality of air slats for the directional discharge of air after it has been filtered. Preferably, the discharge vent 32 is strategically placed on the top surface 20 to minimize the likelihood of having objects, liquids or other materials fall into the vent 32.

Figure 4A:
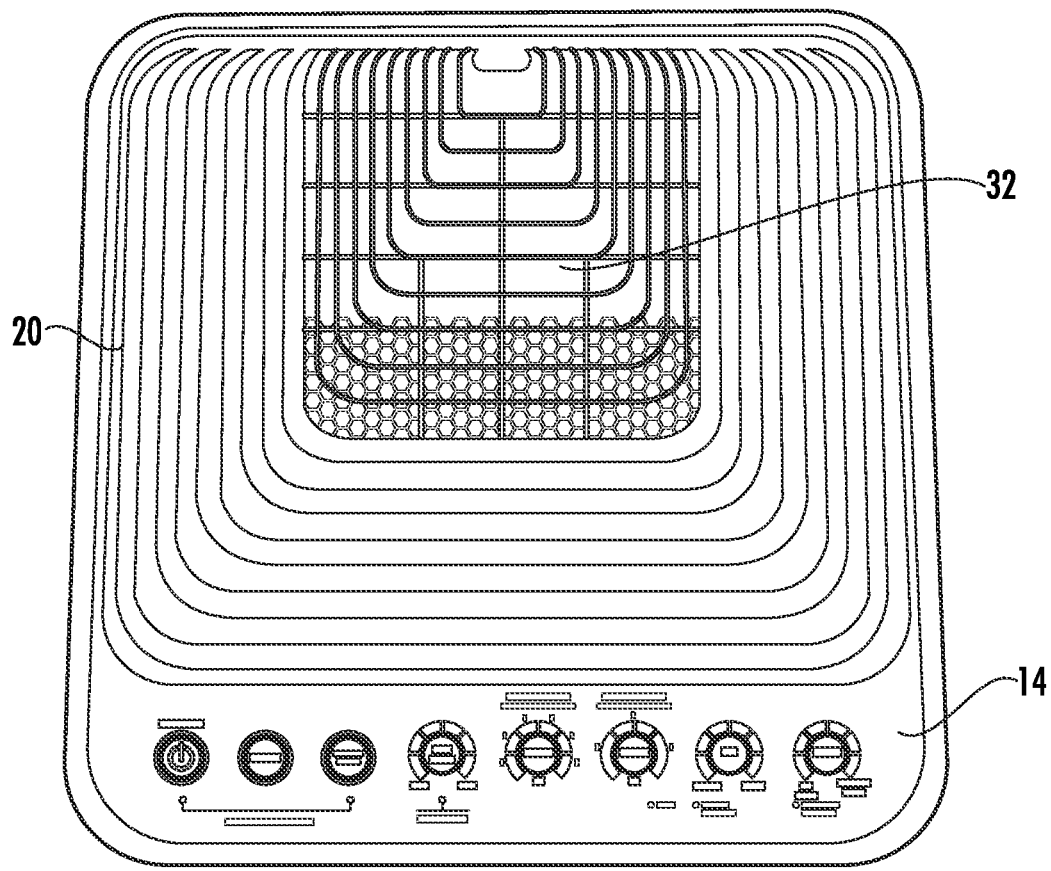
FIGS. 4A and 4B are top views of an embodiment showing a preferred control panel and air vent opening.
Figure 4B:
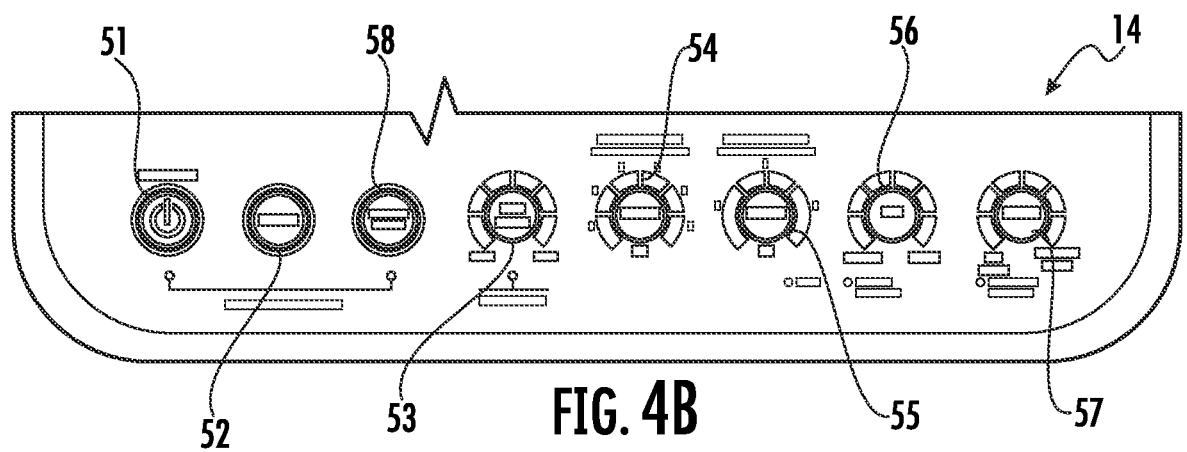
Figure 5:
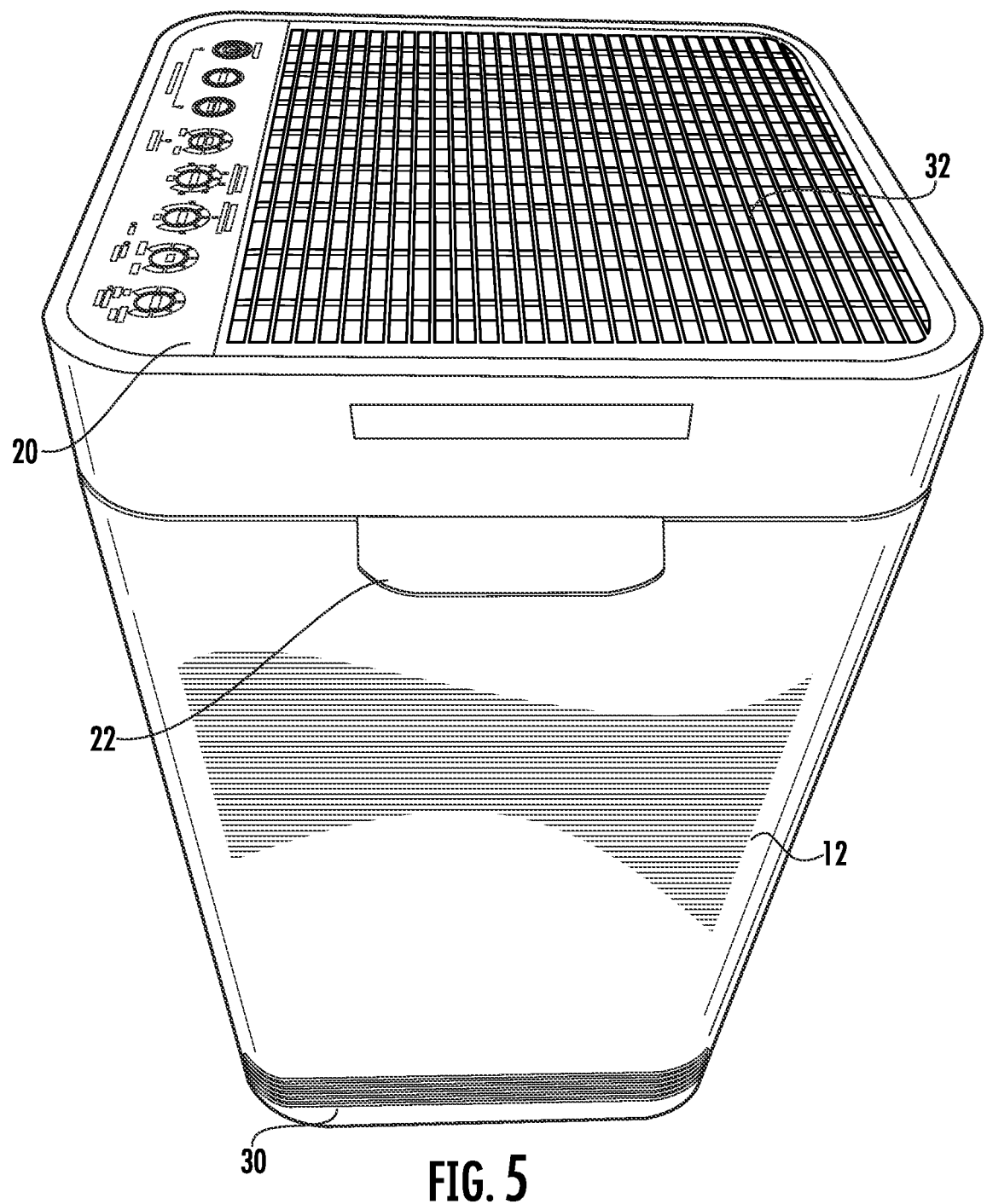
FIG. 5 is a side view of the embodiment of FIG. 2.
Figure 6:
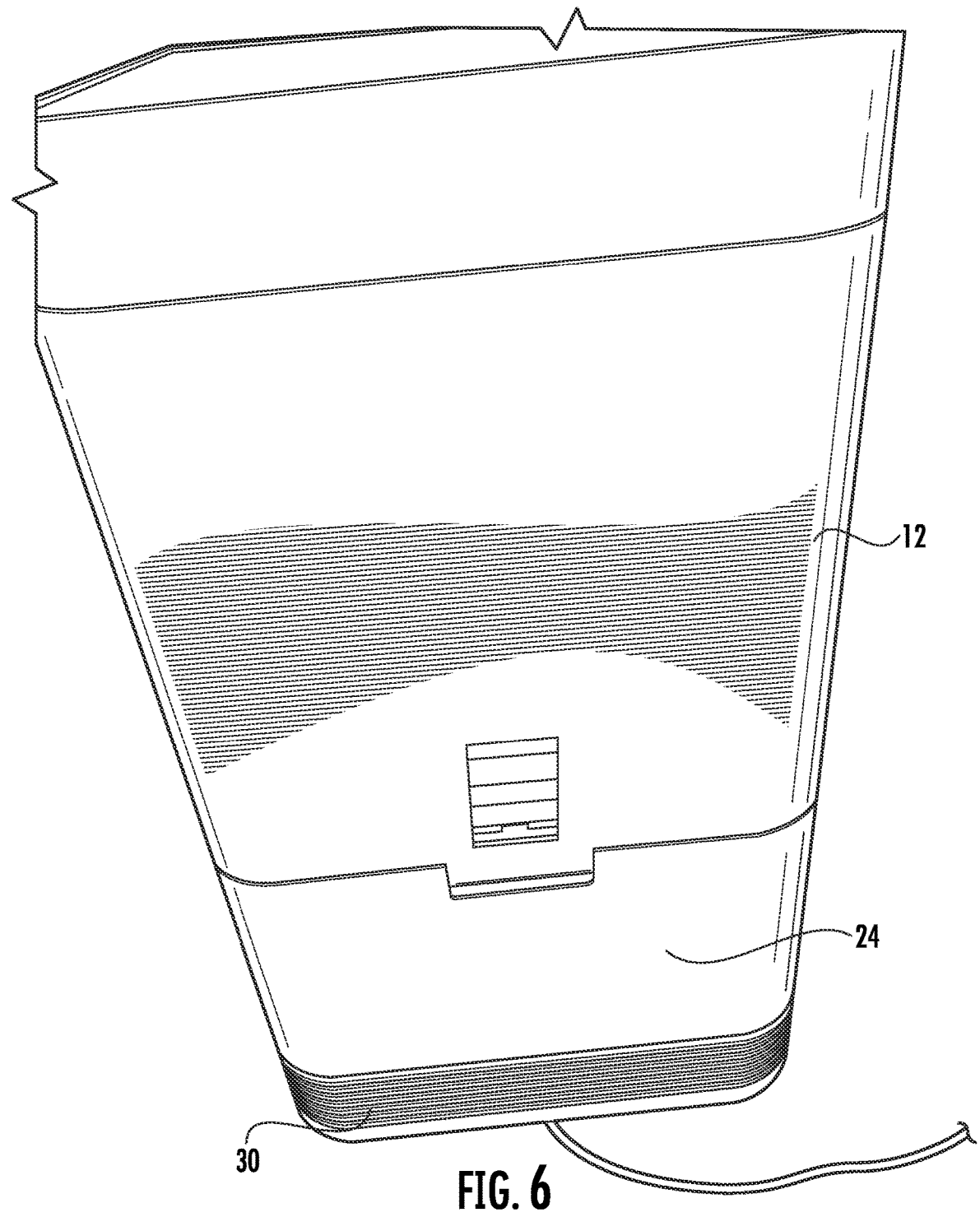
FIG. 6 is a rear view of the embodiment of FIG. 2, including the cover panel for the filter chamber.
Figure 7:
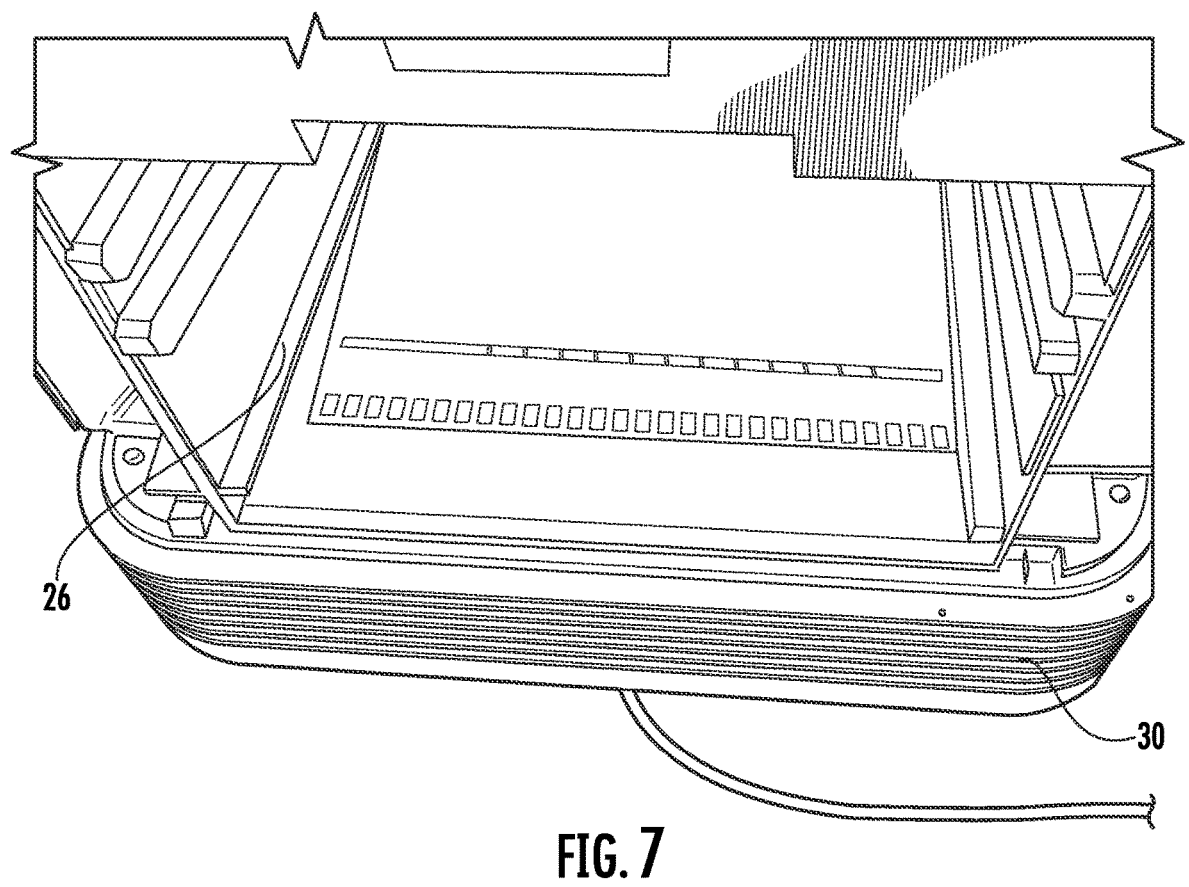
FIG. 7 is another rear view of the embodiment of FIG. 2 with the cover panel removed to show an empty filter chamber.
Figure 8:
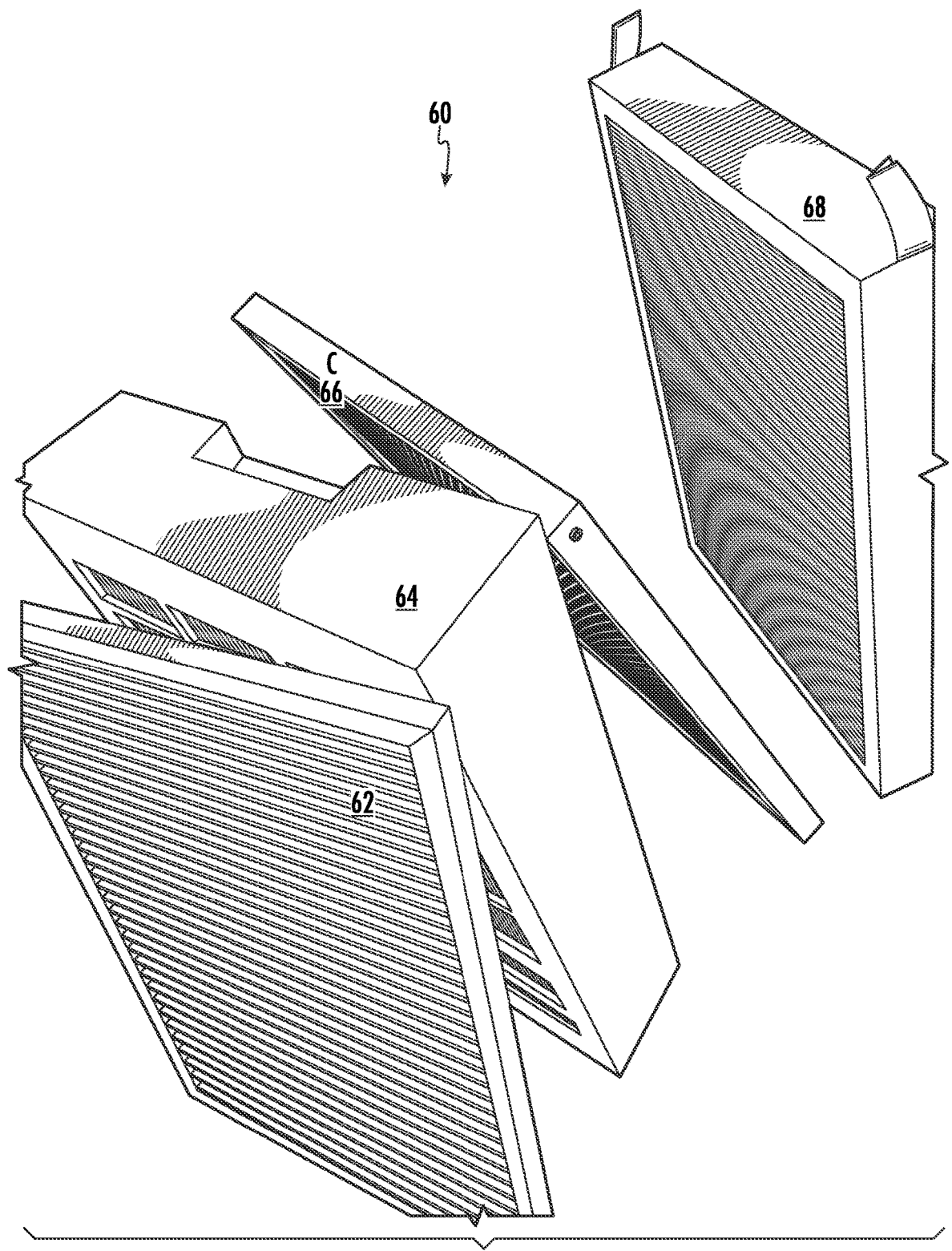
FIG. 8 is a perspective view of a series of four filters used in the embodiment of FIG. 2.
Figure 9:
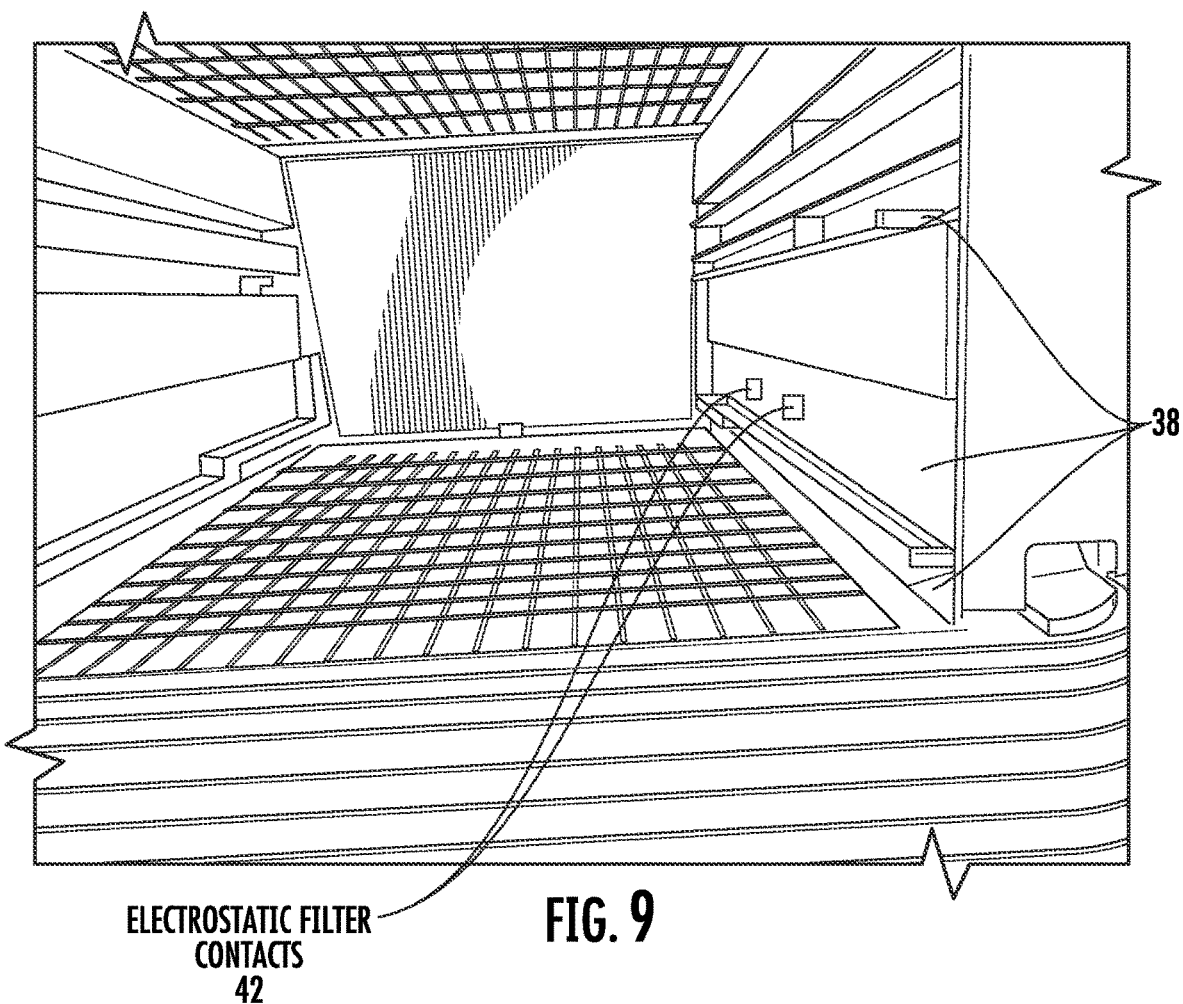
FIG. 9 is an internal view of the empty filter chamber of FIG. 7.
Figure 10A:
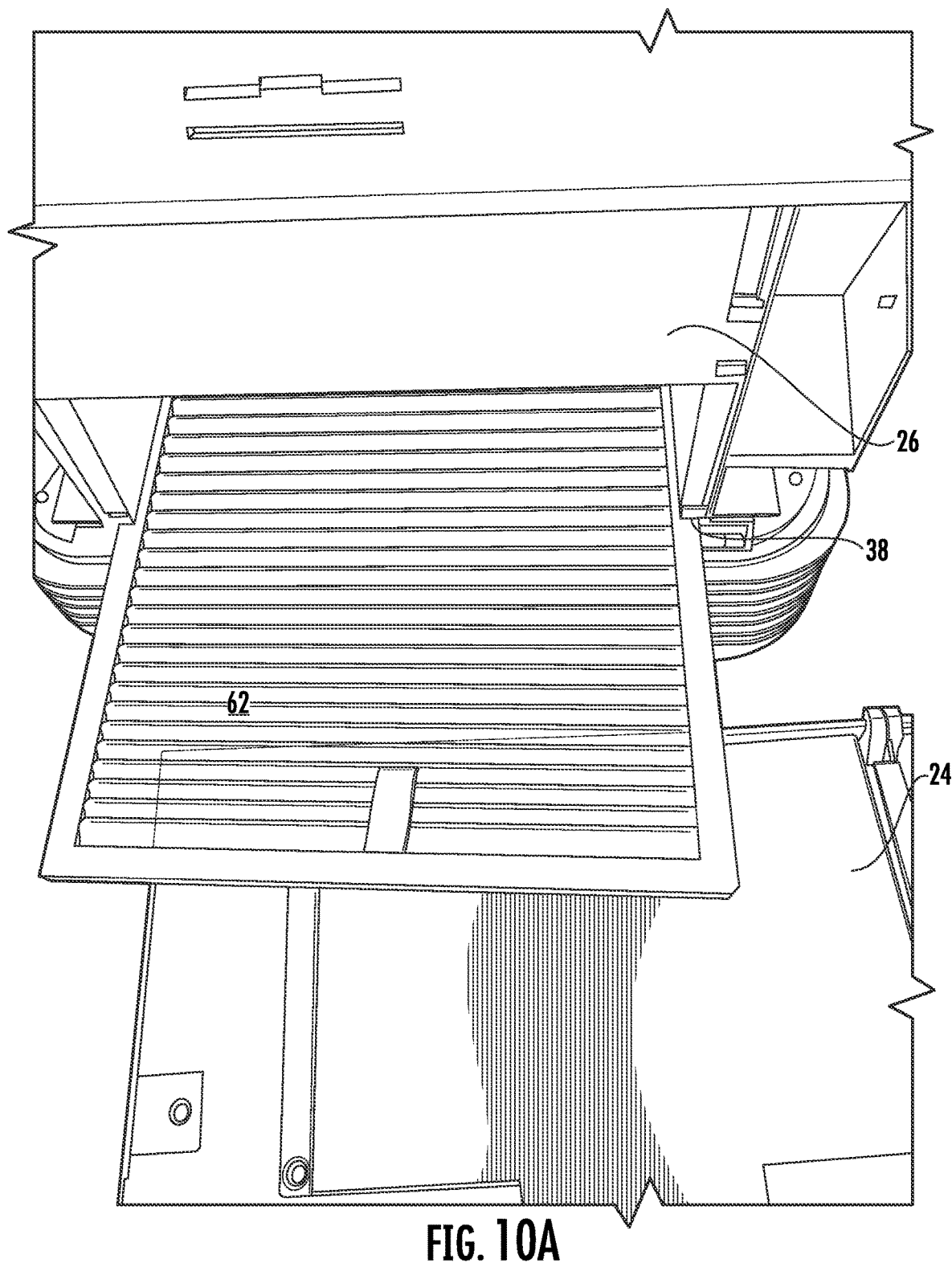
FIG. 10A is a rear view of the embodiment of FIG. 2 showing the insertion of a bottom filter.
Figure 10B:
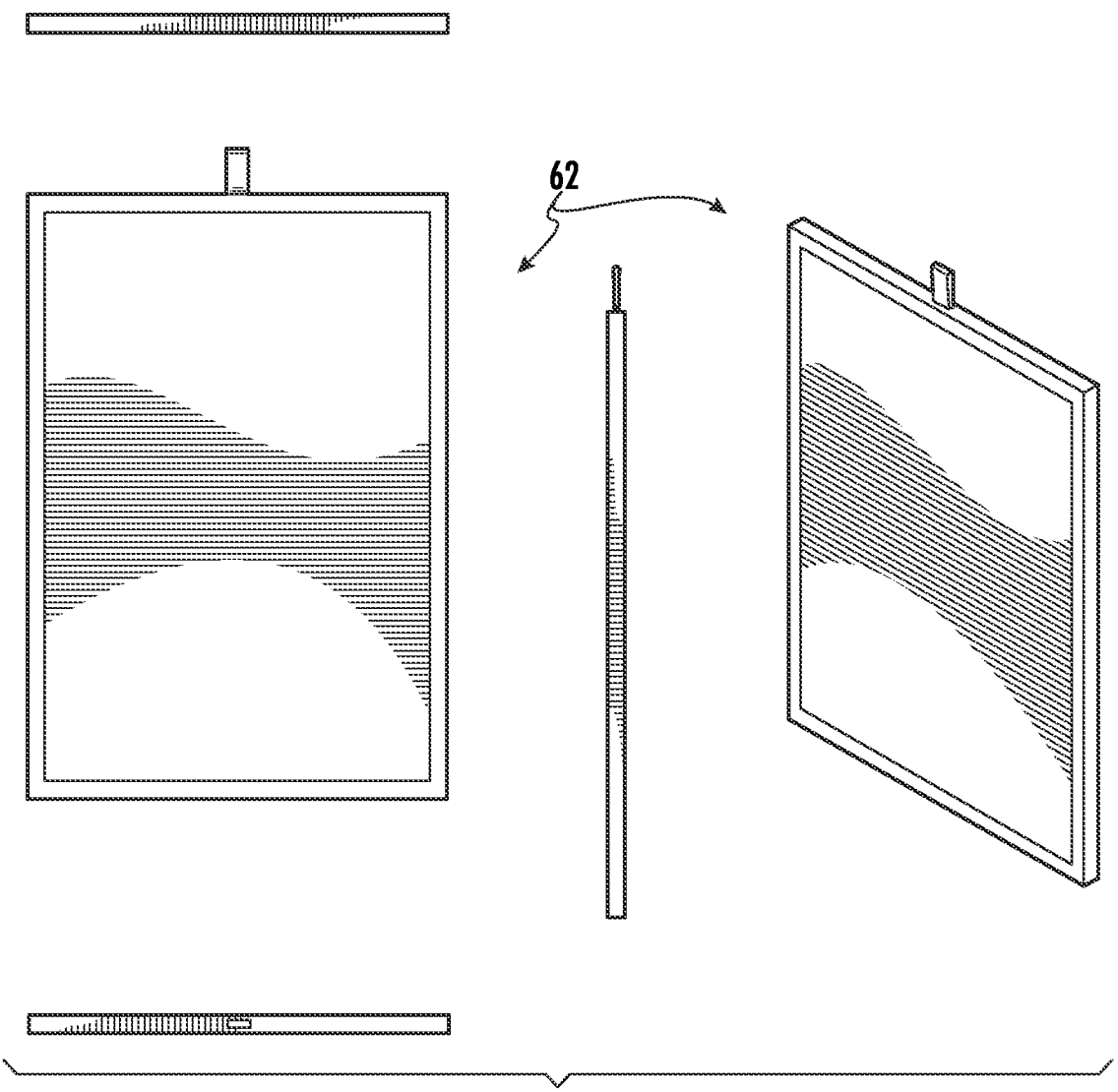
FIG. 10B shows multiple views of an embodiment of the pre-filter.
Figure 11A:
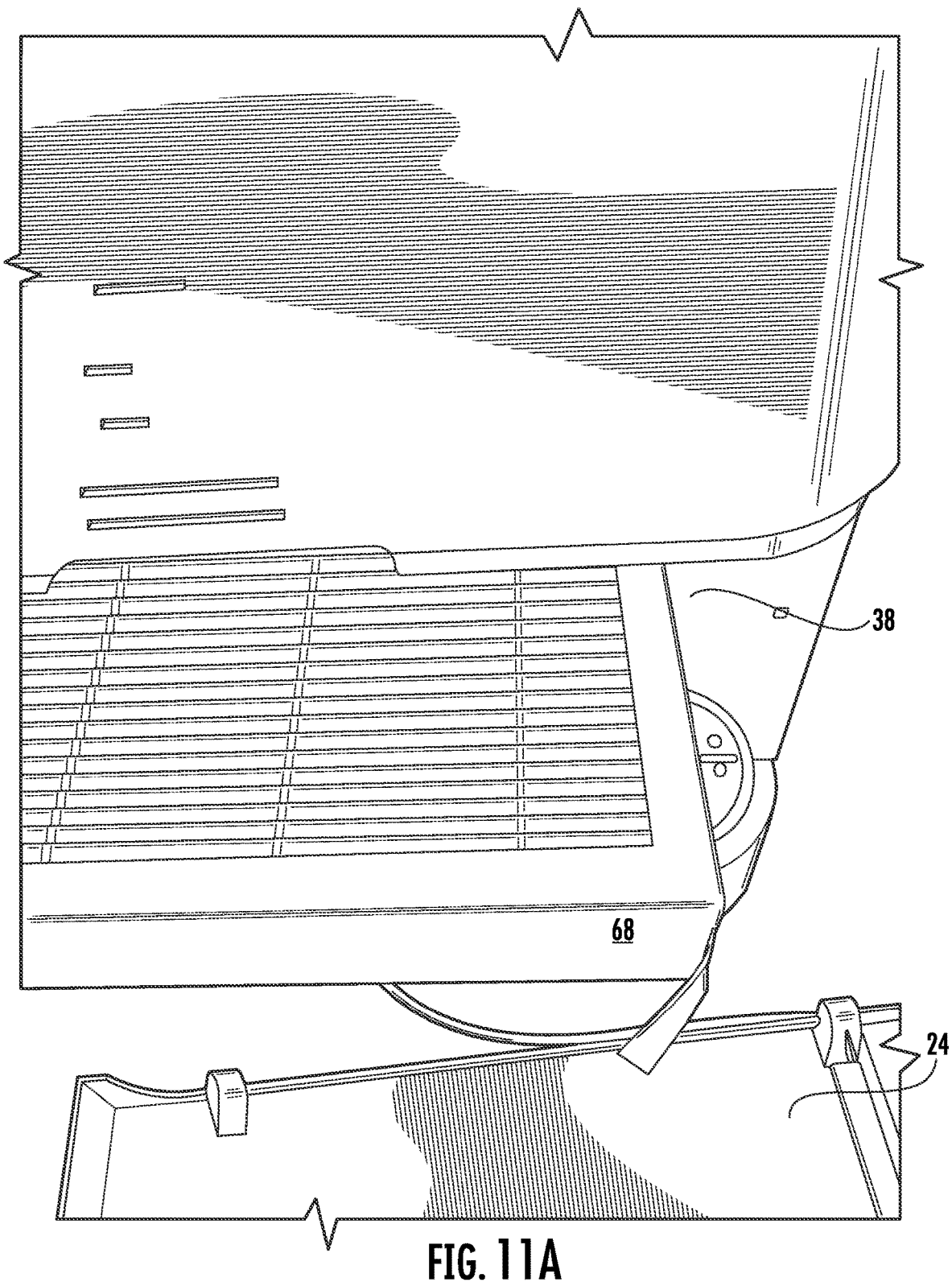
FIG. 11A is a rear view showing the insertion of a top filter.
Figure 11B:
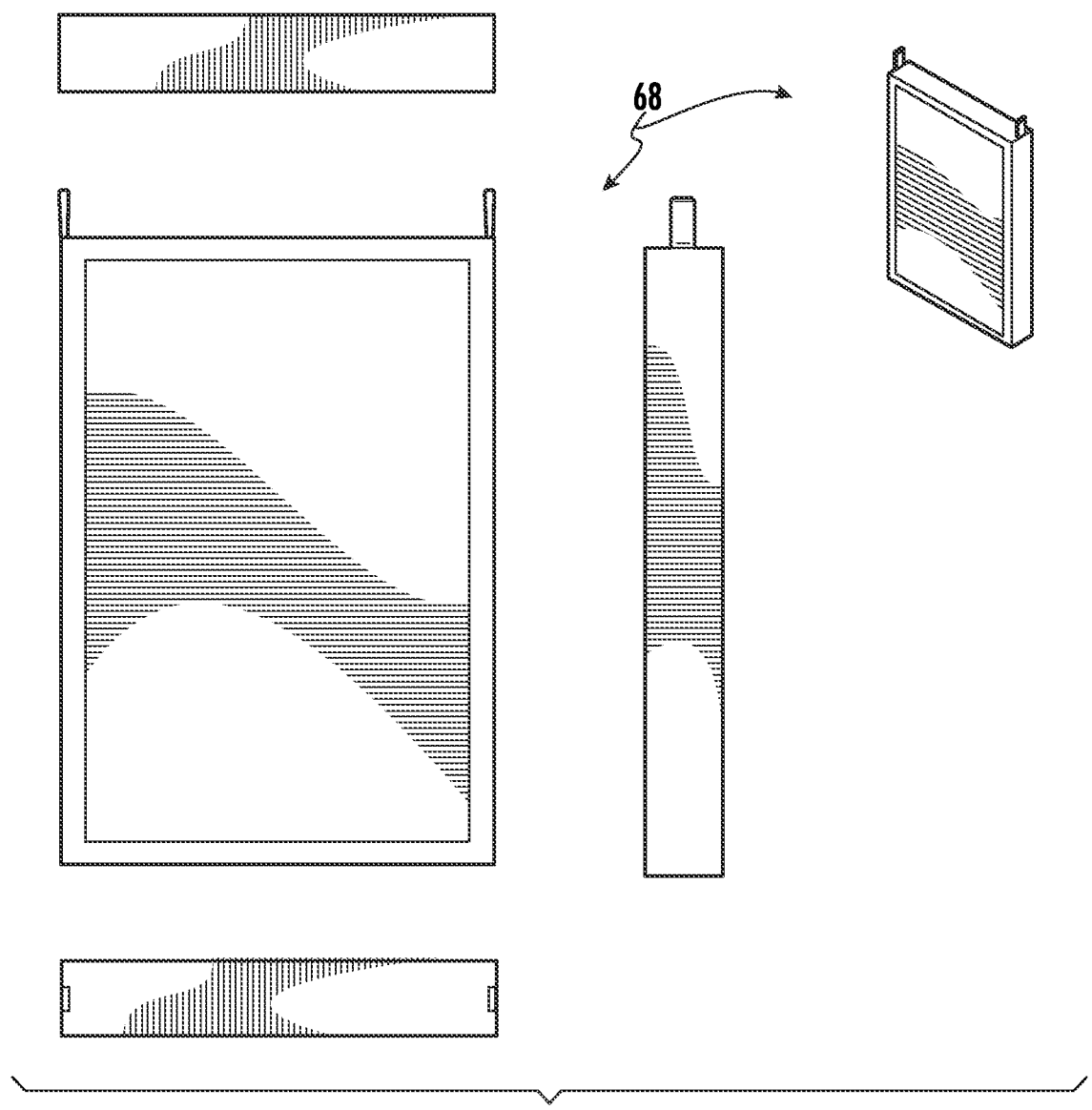
FIG. 11B shows multiple views of an embodiment of the carbon filter.
Figure 12A:
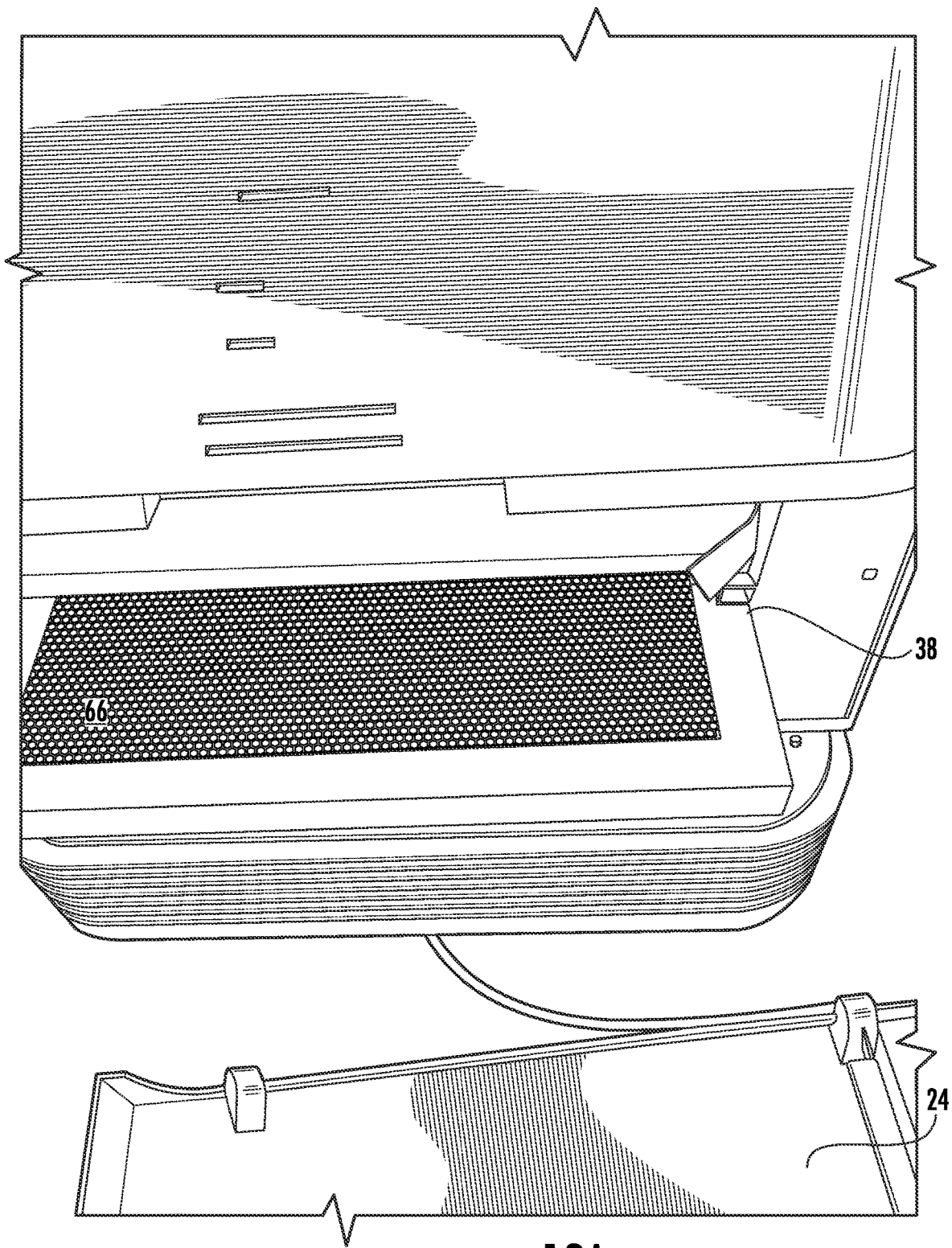
FIG. 12A is a rear view showing the insertion of a second filter just below the top filter.
Figure 12B:
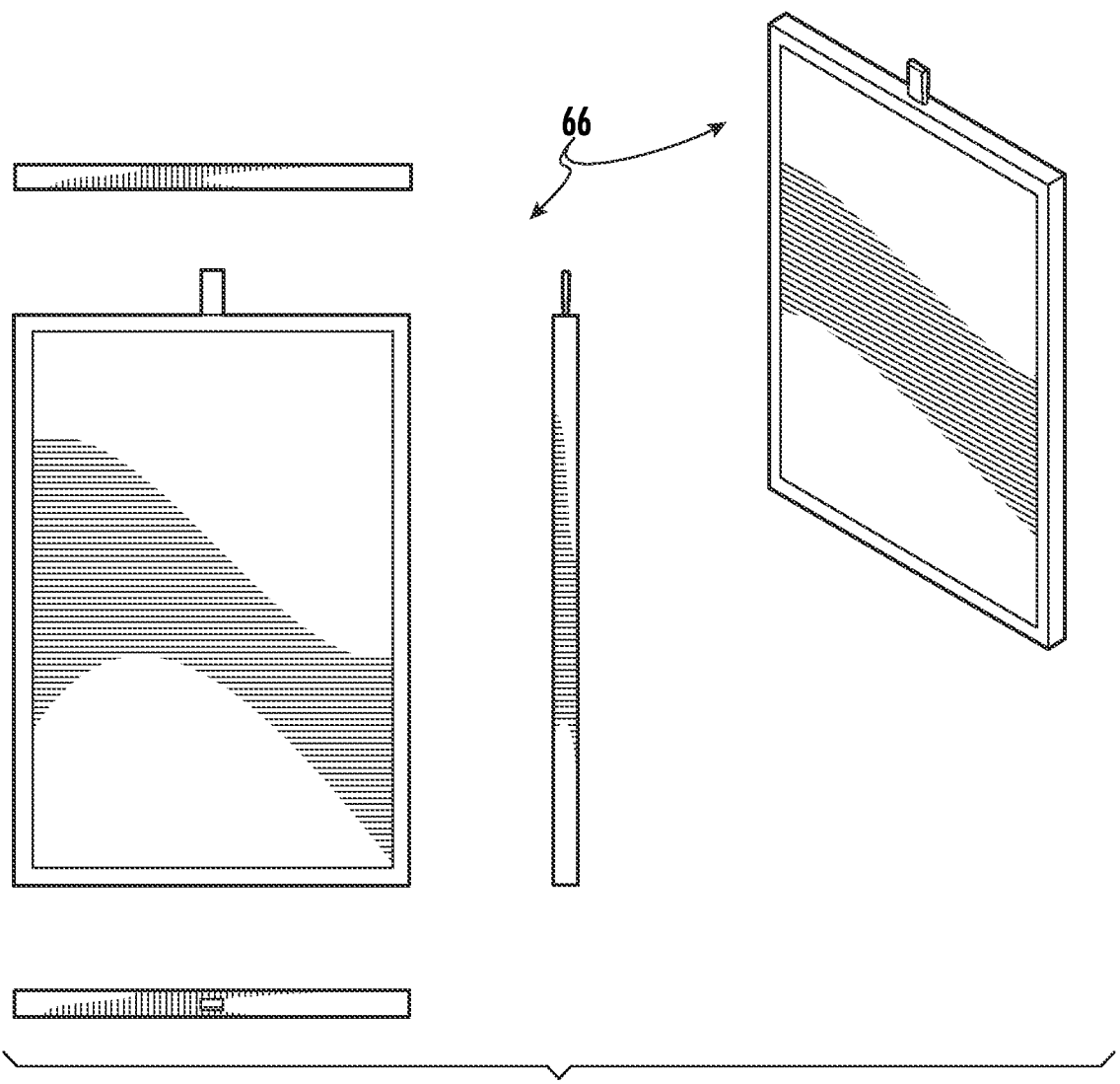
FIG. 12B shows multiple views of an embodiment of the ozone (cold-catalyst) filter.
Figure 13:
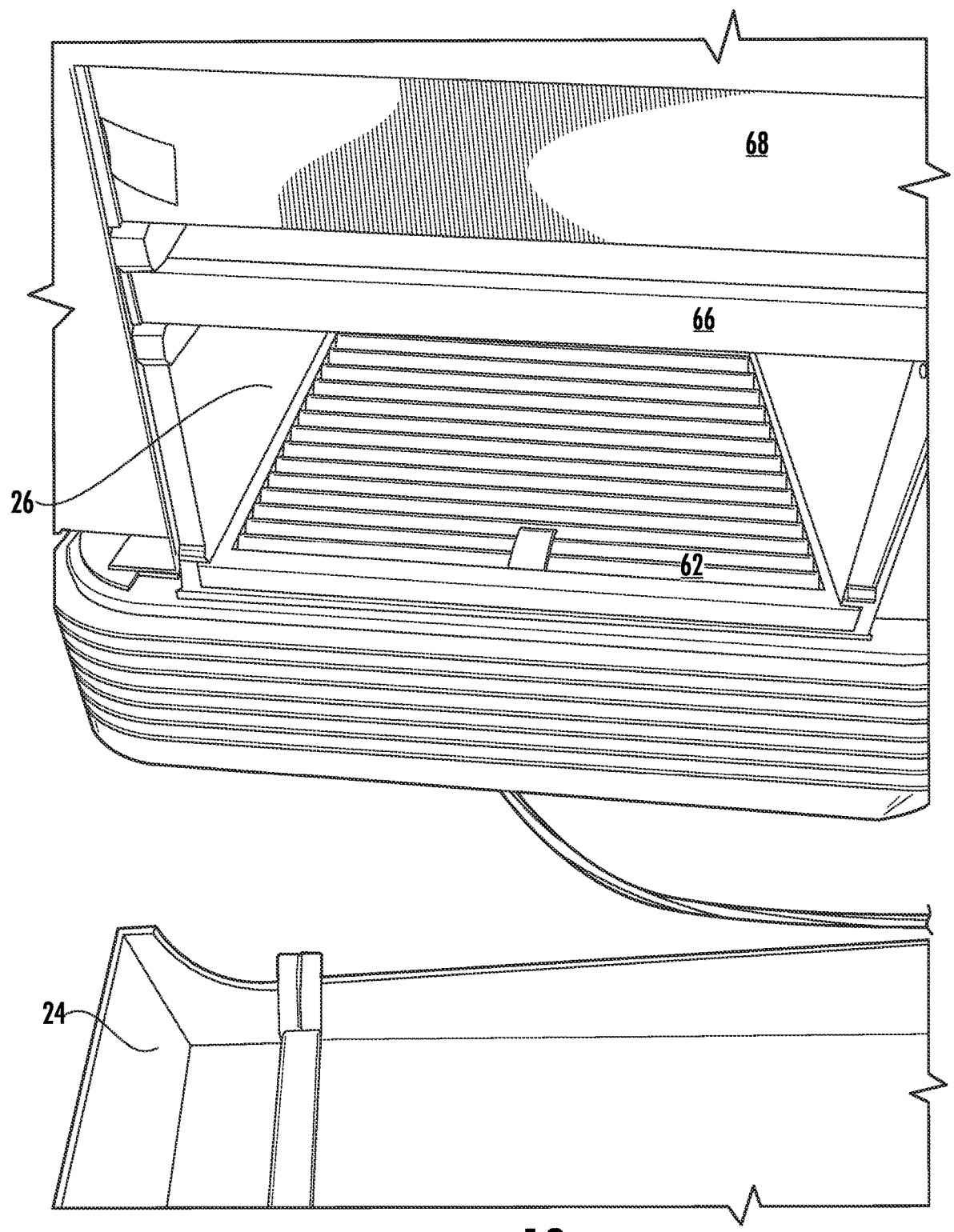
FIG. 13 is a rear view showing the top, second and bottom filters in place leaving an opening for a electrostatic collection unit.
Figure 14A:
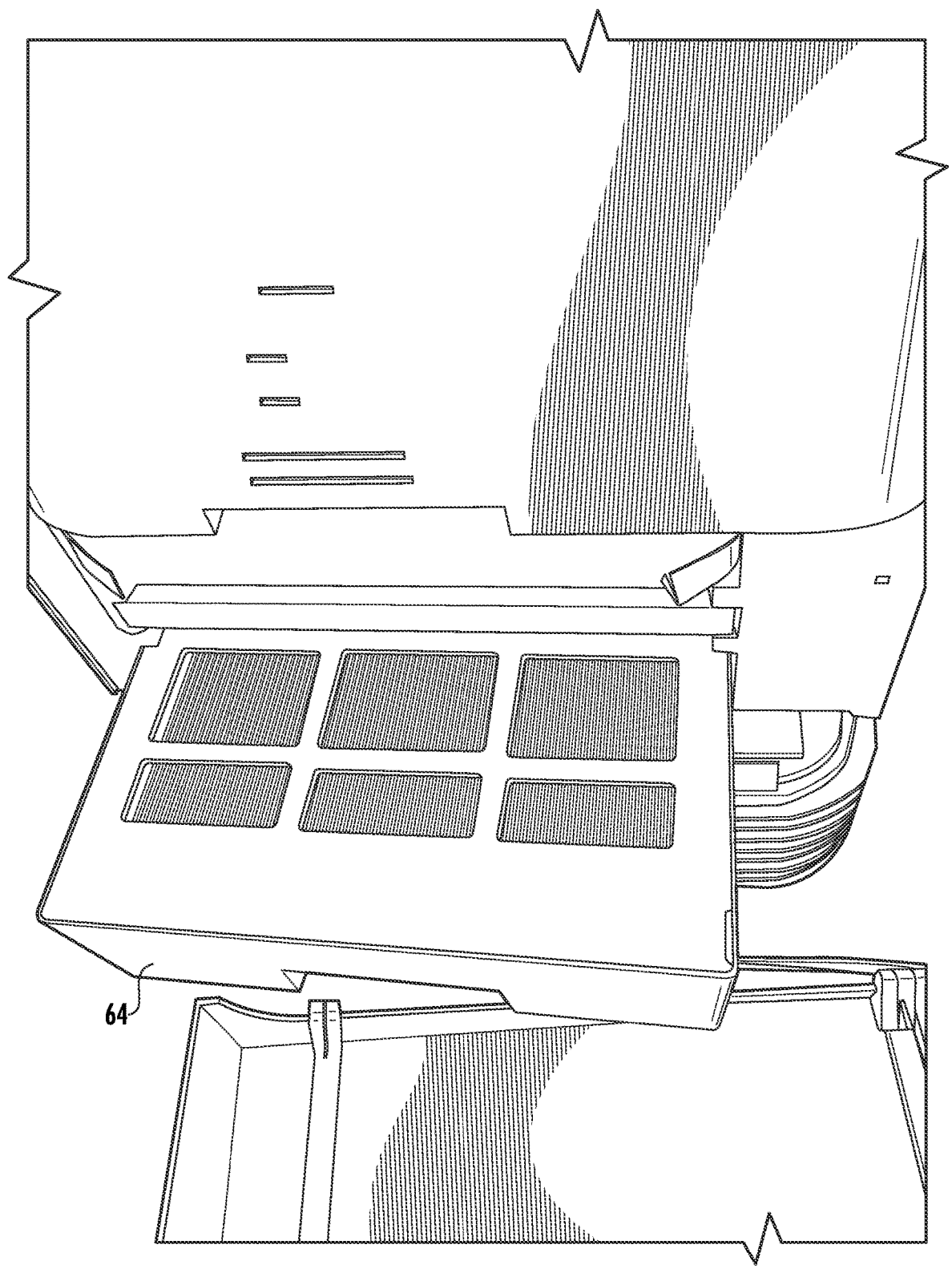
FIG. 14A is a rear view showing the insertion of the electrostatic collection unit.
Figure 14B:
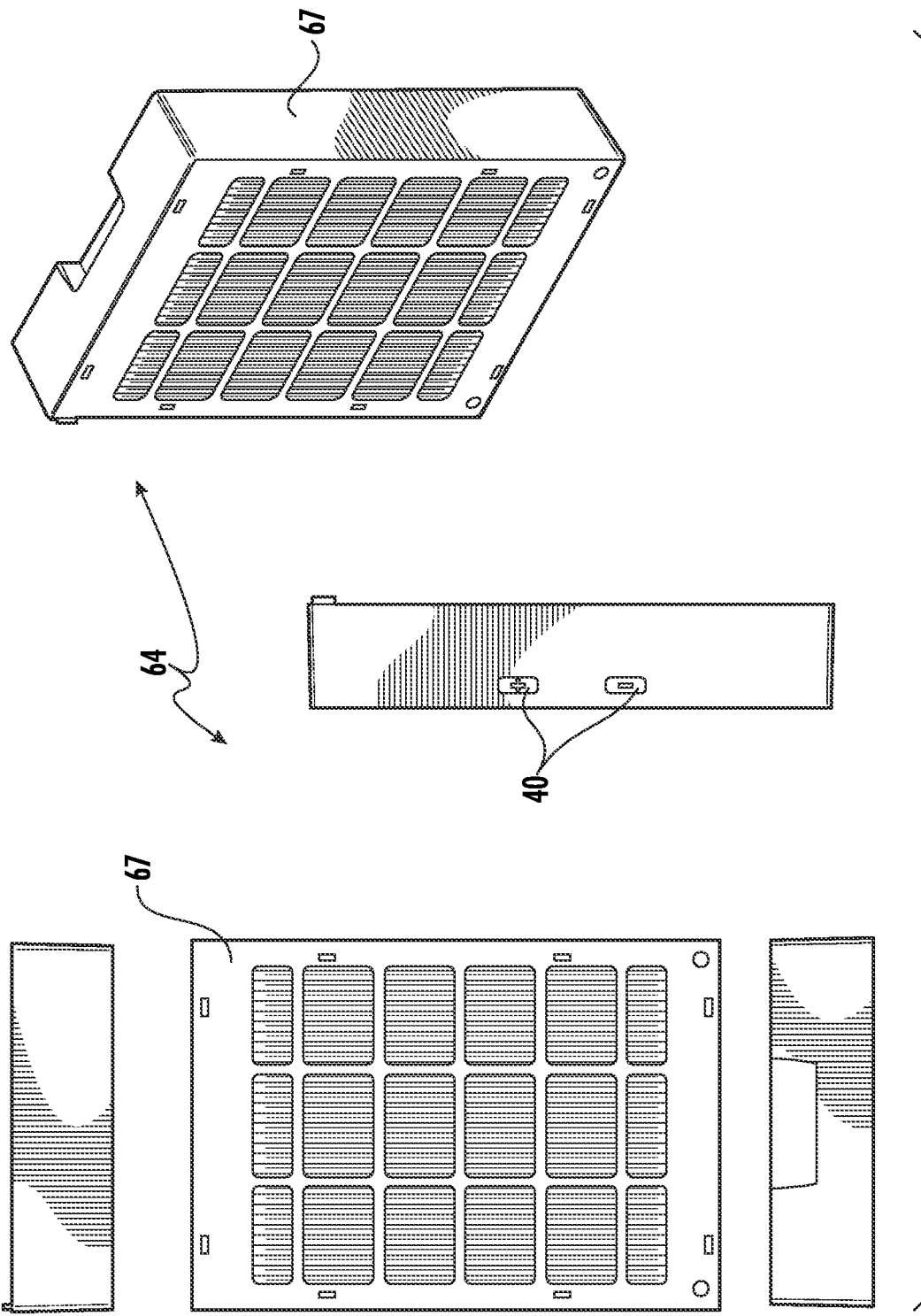
FIG. 14B shows multiple views of an embodiment of the electrostatic filter.
Figure 15:
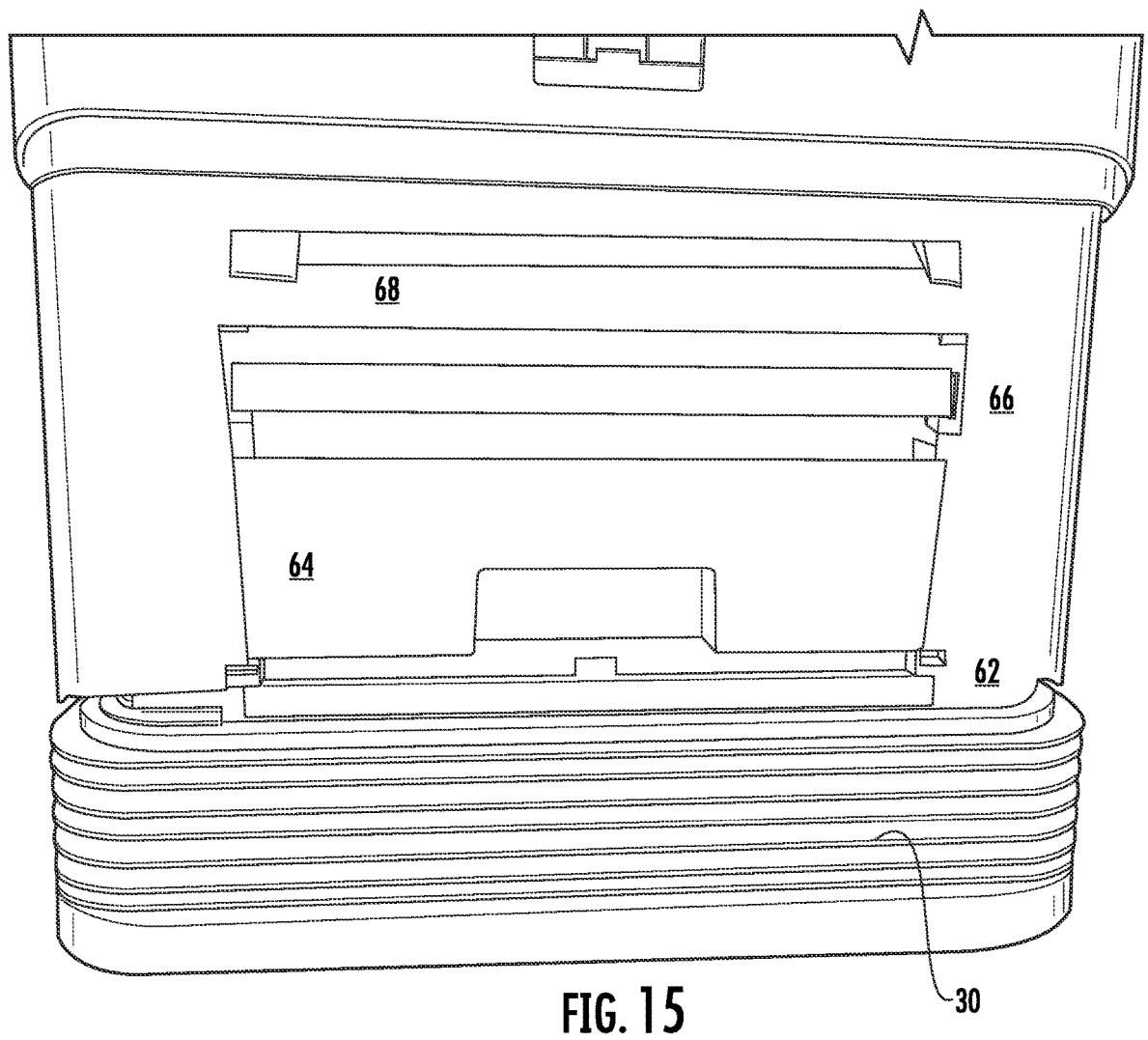
FIG. 15 is a rear view showing the top filter, second filter, electrostatic collection unit and bottom filter in place.
Figure 16:
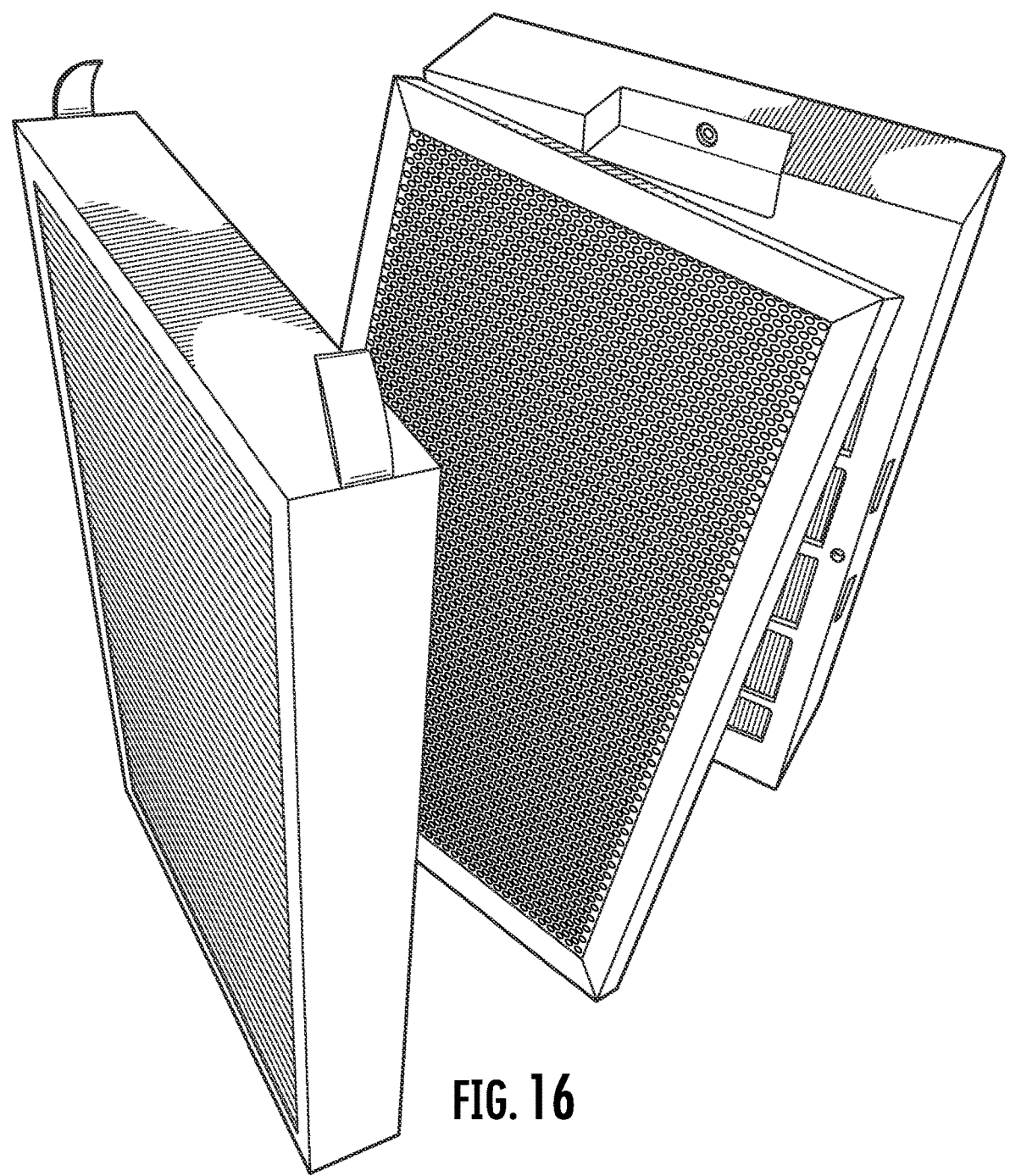
FIG. 16 is a perspective view of the top and second filters and the electrostatic collection unit.
Figure 17:
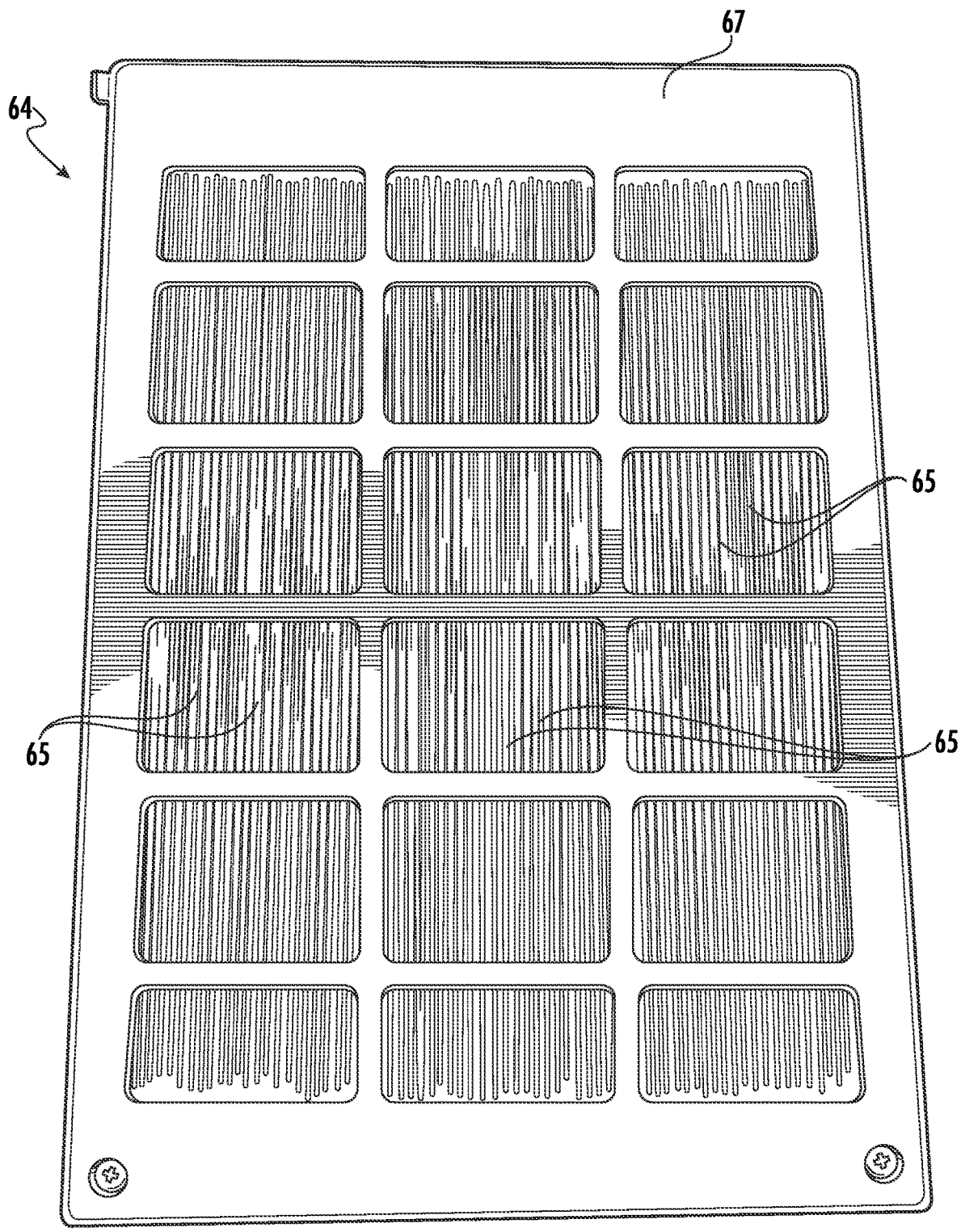
Figure 18:
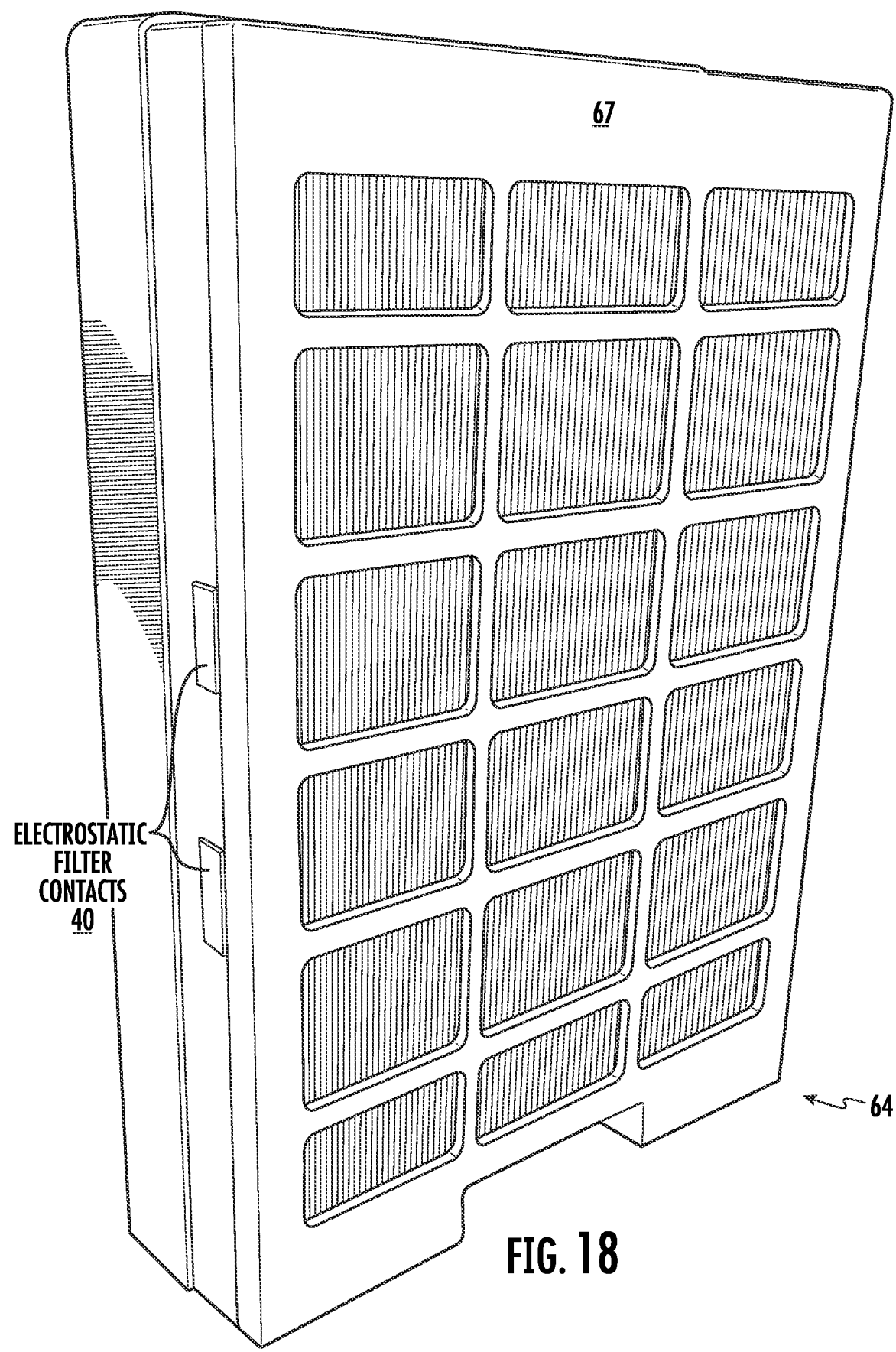
Figure 19:
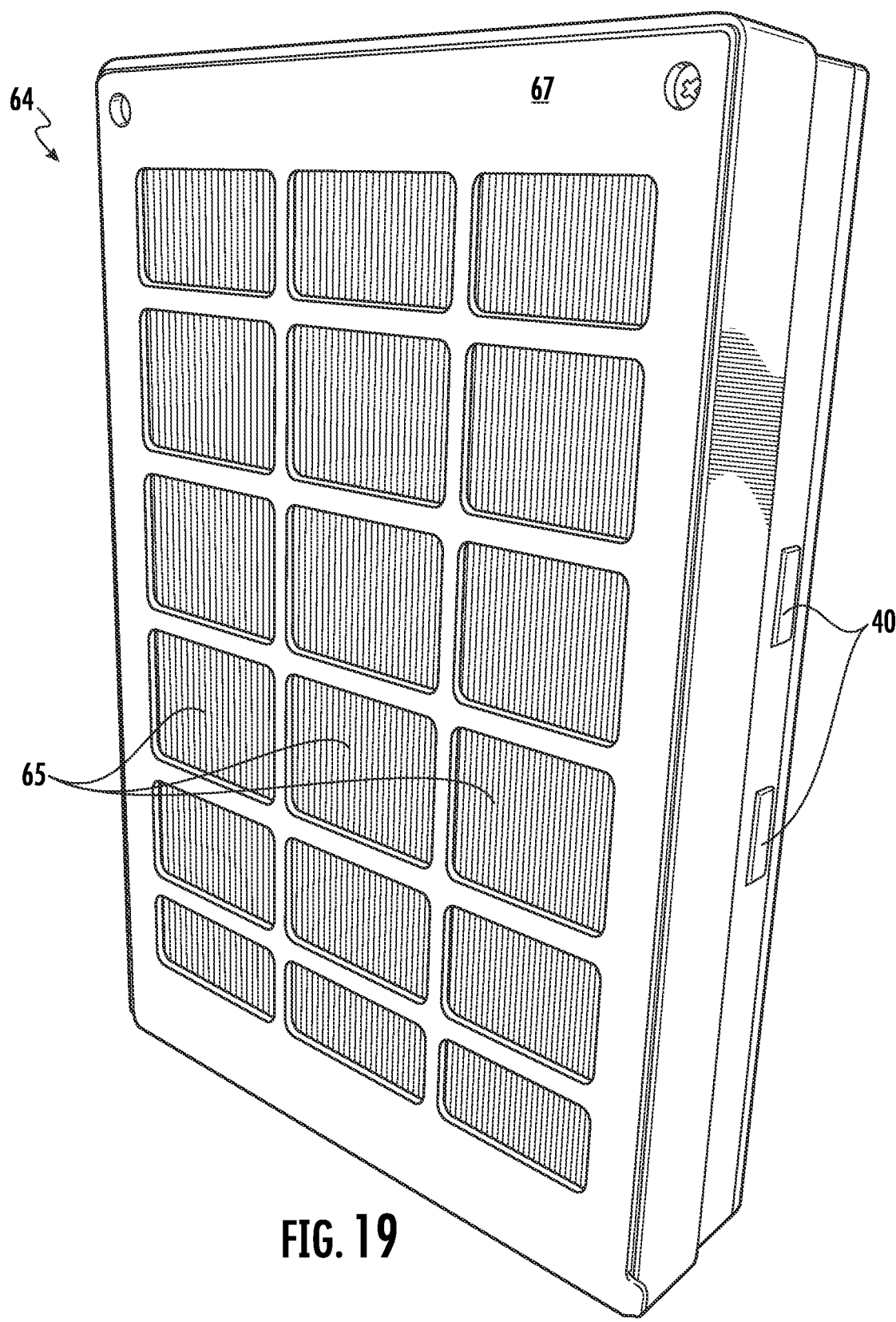

As shown in FIG. 4b, the control panel 14 has numerous buttons 50 for setting options. In addition to the "Power" button 51, the control panel 14 includes "Auto" 52, "Fan Speed" 53, "Timer" 54, "Turbo" 55, "Air" 56, and "Odor" 57. An "Ultimate Clean" button 58 may also be added to the control panel 14. The operation of these buttons and the system 10, in general, is detailed further below. The panel 14 is preferably touch-control with backlighting and light indicators to show operation modes and operation levels.

Referring to FIGS. 7-16, the filter chamber 26 and individual filters 60 are shown. Each of the four filters 60 has its own slot 38 to prevent mixing up the order of the filters 60. The filters 60 can be easily slid into and out of their respective slots 38 for cleaning and/or replacement. The first (bottom-most) filter is a pre-filter 62. The pre-filter 62 is used to remove larger particles from the incoming air. These large particles may pose a threat to the other filters in the chamber 26. The second and largest filter is an electrostatic filter 64. The filter 64 has two contacts 40 on one side which couple to contacts 42 shown within the filter chamber 26. These two sets of contacts 40 and 42 electrically couple the filter 64 to the control panel 14. The electrostatic filter 64 is able to charge particles which are then collected on an oppositely charged surface provided by the plurality of filter strips 65. These strips 65 are arranged close together within the filter frame 67 to maximize efficiency.

The third filter is a cold catalyst filter 66 for removing pollutants and harmful volatile organic compounds (VOCs) from the filtered air. The cold catalyst filter 66 decomposes a variety of harmful gases, such as formaldehyde, ammonia, benzene, hydrogen sulfide and more VOCs, to produce water and carbon dioxide.

Finally, the last (upper-most) filter is an activated carbon filter 68 for removal of odors from the filtered air.

A fan 44 is positioned above the filter chamber 26 within the housing 12 to draw air into the air intake vents 30 at the bottom of the purifier 10, through each of the filters 60 in the filter chamber 26, and then out the vents 32 at the top of the system 10 (see FIG. 4A). The speed of the fan 44 is electronically controlled at the control panel 14. Various air sensors and or timers may be used to indicate a time when each of the filters 60 needs to be cleaned or replaced.

FIGS. 17-21 show a preferred embodiment of the electrostatic filter 64 used in the disclosed air purifier system 10. The filter 64 can be readily rinsed clean to remove particles before returning it to the proper slot 38 in the filter chamber 26.

As shown, the filter 64 comprises a rectangular housing 70 and a plurality of minutely-spaced filter strips 65 within. The strips 65 can be charged with about 8,000 volts of electricity during use to charge and capture particles as they pass between the strips 65. The number of strips 65 used is preferably about 10-15 strips per inch (4-6 per cm), most preferably about 12 strips per inch (about 5 per cm).

Testing Data

Referring now to TABLES 1-7, actual test data is shown comparing the system of the present application to well-known prior art air purifying systems. The present system (NW) was compared to six different products to evaluate the effectiveness of each, including such factors as dust removal, smoke removal, formaldehyde removal, ozone creation, and noise. The various systems were also tested at increments of every 10 mins of operation over a two hour (120 mins) period for overall effectiveness on formaldehyde removal (Table 2) and over a one hour (60 mins) period for overall effectiveness on dust removal (Tables 3-7).

Table 1 below is a data table showing results of tests for dust particle removal, formaldehyde removal, as well as ozone and noise output between a system of the present system (NW) and a leading prior art air purifying system (AN).

TABLE 1

| Test item | dust CADR | dust removal rate | formaldehyde CADR | formaldehyde remove rate | Ozone | Noise dB(A) |
|---|---|---|---|---|---|---|
| NW | 577 m³/h (339 CFM) | >99.9% | 245 m3/h | >99.9% | <0.1 × 10⁻⁶% (Not detected) | 66 |
| AN | 524 m³/h (308 CFM) | >99.9% | 48 m3/h | 82% | (Not detected) | 68 |

As can be seen by TABLE 1, the present system 10 removes a greater amount of formaldehyde while producing less ozone and less noise.

Table 2 is a data table showing results of formaldehyde removal tests performed between a system of the present invention (NW) and six (6) leading prior art air purifying systems (AN, BB, CC, DD, EE, and FF) at 12 time intervals.

TABLE 2

| Formaldehyde | NW | AN | BB | CC |
|---|---|---|---|---|
| 10 Min | 82.3% | 36.5% | 2.0% | 0.0% |
| 20 Min | 92.7% | 48.1% | 1.0% | 0.0% |
| 30 Min | 98.8% | 61.0% | 3.0% | 1.0% |
| 40 Min | 99.7% | 62.0% | 3.0% | 2.0% |
| 50 Min | >99.9% | 71.6% | 5.0% | 2.0% |
| 60 Min | >99.9% | 72.9% | 5.0% | 1.0% |
| 70 Min | >99.9% | 73.1% | can't remove formaldehyde | can't remove formaldehyde |
| 80 Min | >99.9% | 73.7% | — | — |
| 90 Min | >99.9% | 76.4% | — | — |
| 100 Min | >99.9% | 76.4% | — | — |
| 110 Min | >99.9% | 79.0% | — | — |
| 120 Min | >99.9% | 79.4% | — | — |

TABLE 2-continued

| Formaldehyde | DD | EE | FF |
|---|---|---|---|
| 10 Min | 0.0% | 35.4% | 15.7% |
| 20 Min | 0.7% | 59.1% | 21.1% |
| 30 Min | 0.0% | 73.1% | 22.9% |
| 40 Min | 1.4% | 78.9% | 31.0% |
| 50 Min | 2.8% | 84.2% | 41.8% |
| 60 Min | 4.3% | 89.7% | 64.6% |
| 70 Min | can't remove formaldehyde | 91.1% | 63.3% |
| 80 Min | — | 91.9% | 71.5% |
| 90 Min | — | 92.2% | 72.6% |
| 100 Min | — | 93.9% | 75.1% |
| 110 Min | — | 95.6% | 75.3% |
| 120 Min | — | 95.7% | 75.8% |

As can be seen in TABLE 2, system 10 of the present disclosure removes more formaldehyde than the competing air purifying systems at each of the 10 minute intervals.

Table 3 is a data table showing results of particle removal tests between a system of the present invention (NW) and a leading prior art air purifying system (AN). Percent removal of particles of five different sizes over six different times were tested and recorded for each of the two systems.

TABLE 3

| Dust remove rate | CADR: 524 m³/h(308 CFM) 0.1 um | 0.3 um | 0.5 um |
|---|---|---|---|
| 10 Min | NW 95.6%/AN 94.6% | NW 95.1%/AN 95.0% | NW 94.9%/AN 95.3% |
| 20 Min | NW 99.8%/AN 99.8% | NW 99.8%/AN 99.8% | NW 99.8%/AN 99.8% |
| 30 Min | NW > 99.9%/AN > 99.9% | NW > 99.9%/AN > 99.9% | NW > 99.9%/AN > 99.9% |
| 40 Min | NW > 99.9%/AN > 99.9% | NW > 99.9%/AN > 99.9% | NW > 99.9%/AN > 99.9% |
| 50 Min | NW > 99.9%/AN > 99.9% | NW > 99.9%/AN > 99.9% | NW > 99.9%/AN > 99.9% |
| 60 Min | NW > 99.9%/AN > 99.9% | NW > 99.9%/AN > 99.9% | NW > 99.9%/AN > 99.9% |

| Dust remove rate | 1 um | 2.5 um |
|---|---|---|
| 10 Min | NW 94.7%/AN 96.2% | NW 94.7%/AN 96.2% |
| 20 Min | NW 99.8%/AN 99.8% | NW 99.8%/AN 99.8% |
| 30 Min | NW > 99.9%/AN > 99.9% | NW > 99.9%/AN > 99.9% |
| 40 Min | NW > 99.9%/AN > 99.9% | NW > 99.9%/AN > 99.9% |
| 50 Min | NW > 99.9%/AN > 99.9% | NW > 99.9%/AN > 99.9% |
| 60 Min | NW > 99.9%/AN > 99.9% | NW > 99.9%/AN > 99.9% |

As can be seen in TABLE 3, the two systems are basically identical in the removal of dust particles of each size.

Table 4 is another data table showing results of particle removal tests between a system of the present invention (NW) and a leading prior art air purifying system (BB). Percent removal of particles of five different sizes over six different time intervals were tested and recorded for each of the two systems.

TABLE 4

| Dust remove rate | CADR: 464 m3/h(273 CFM) | NW vs. BB | |
|---|---|---|---|
| | 0.1 um | 0.3 um | 0.5 um |
| 10 Min | NW 95.6%/92.0% | NW 95.1%/92.33% | NW 94.9%/96.2% |
| 20 Min | NW 99.8%/99.8% | NW 99.8%/99.5% | NW 99.8%/99.8% |
| 30 Min | NW > 99.9%/>99.9% | NW > 99.9%/>99.9% | NW > 99.9%/>99.9% |
| 40 Min | NW > 99.9%/>99.9% | NW > 99.9%/>99.9% | NW > 99.9%/>99.9% |
| 50 Min | NW > 99.9%/>99.9% | NW > 99.9%/>99.9% | NW > 99.9%/>99.9% |
| 60 Min | NW > 99.9%/>99.9% | NW > 99.9%/>99.9% | NW > 99.9%/>99.9% |

| Dust remove rate | 1 um | 2.5 um |
|---|---|---|
| 10 Min | NW 94.7%/94.7% | NW 94.7%/96.2% |
| 20 Min | NW 99.8%/99.9% | NW 99.8%/99.9% |
| 30 Min | NW > 99.9%/>99.9% | NW > 99.9%/>99.9% |
| 40 Min | NW > 99.9%/>99.9% | NW > 99.9%/>99.9% |
| 50 Min | NW > 99.9%/>99.9% | NW > 99.9%/>99.9% |
| 60 Min | NW > 99.9%/>99.9% | NW > 99.9%/>99.9% |

As can be seen in TABLE 4, the two systems are basically identical in the removal of dust particles of each size after 20 minutes.

Table 5 is another data table showing results of particle removal tests between a system of the present invention (NW) and a leading prior art air purifying system (CC). Percent removal of particles of five different sizes over six different time intervals were tested and recorded for each of the two systems.

TABLE 5

| Dust remove rate | CADR: 575 m3/h(338 CFM) | NW vs. CC | |
|---|---|---|---|
| | 0.1 um | 0.3 um | 0.5 um |
| 10 Min | NW 95.6%/95.1% | NW 95.1%/95.8% | NW 94.9%/96.6% |
| 20 Min | NW 99.8%/99.8% | NW 99.8%/99.8% | NW 99.8%/99.9% |
| 30 Min | NW > 99.9%/>99.9% | NW > 99.9%/>99.9% | NW > 99.9%/>99.9% |
| 40 Min | NW > 99.9%/>99.9% | NW > 99.9%/>99.9% | NW > 99.9%/>99.9% |
| 50 Min | NW > 99.9%/>99.9% | NW > 99.9%/>99.9% | NW > 99.9%/>99.9% |
| 60 Min | NW > 99.9%/>99.9% | NW > 99.9%/>99.9% | NW > 99.9%/>99.9% |

| Dust remove rate | 1 um | 2.5 um |
|---|---|---|
| 10 Min | NW 94.7%/98.2% | NW 94.7%/98.8% |
| 20 Min | NW 99.8%/99.9% | NW 99.8%/99.9% |
| 30 Min | NW > 99.9%/>99.9% | NW > 99.9%/>99.9% |
| 40 Min | NW > 99.9%/>99.9% | NW > 99.9%/>99.9% |
| 50 Min | NW > 99.9%/>99.9% | NW > 99.9%/>99.9% |
| 60 Min | NW > 99.9%/>99.9% | NW > 99.9%/>99.9% |

As can be seen in TABLE 5, the two systems are basically identical in the removal of dust particles of each size after 20 minutes.

Table 6 is still another data table showing results of particle removal tests between a system of the present invention (NW) and a leading prior art air purifying system (DD). Percent removal of particles of five different sizes over six different time intervals were tested and recorded for each of the two systems.

TABLE 6

| Dust remove rate | CADR: 398 m3/h(234 CFM) | NW vs. DD | |
|---|---|---|---|
| | 0.1 um | 0.3 um | 0.5 um |
| 10 Min | NW 95.6%/82.5% | NW 95.1%/89.9% | NW 94.9%/90.9% |
| 20 Min | NW 99.8%/97.8% | NW 99.8%/98.8% | NW 99.8%/99.2% |
| 30 Min | NW > 99.9%/>99.5% | NW > 99.9%/>99.8% | NW > 99.9%/>99.9% |
| 40 Min | NW > 99.9%/>99.9% | NW > 99.9%/>99.9% | NW > 99.9%/>99.9% |
| 50 Min | NW > 99.9%/>99.9% | NW > 99.9%/>99.9% | NW > 99.9%/>99.9% |
| 60 Min | NW > 99.9%/>99.9% | NW > 99.9%/>99.9% | NW > 99.9%/>99.9% |

| Dust remove rate | 1 um | 2.5 um |
|---|---|---|
| 10 Min | NW 94.7%/94.3% | NW 94.7%/95.7% |
| 20 Min | NW 99.8%/99.9% | NW 99.8%/99.9% |
| 30 Min | NW > 99.9%/>99.9% | NW > 99.9%/>99.9% |
| 40 Min | NW > 99.9%/>99.9% | NW > 99.9%/>99.9% |
| 50 Min | NW > 99.9%/>99.9% | NW > 99.9%/>99.9% |
| 60 Min | NW > 99.9%/>99.9% | NW > 99.9%/>99.9% |

As can be seen in TABLE 6, the two systems are basically identical in the removal of dust particles of each size after 30 minutes. However the present system 10 is significantly more effective after only 10 minutes of operation.

Table 7 is a final data table showing results of particle removal tests between a system of the present invention (NW) and a leading prior art air purifying system (EE). Percent removal of particles of five different sizes over six different time intervals were tested and recorded for each of the two systems.

TABLE 7

| Dust remove rate | CADR: 315 m3/h(185 CFM) | NW vs. EE | |
|---|---|---|---|
| | 0.1 um | 0.3 um | 0.5 um |
| 10 Min | NW 95.6%/80.5% | NW 95.1%/83.2% | NW 94.9%/85.9% |
| 20 Min | NW 99.8%/96.8% | NW 99.8%/97.4% | NW 99.8%/98.1% |
| 30 Min | NW > 99.9%/>99.5% | NW > 99.9%/>99.6% | NW > 99.9%/>99.7% |
| 40 Min | NW > 99.9%/>99.9% | NW > 99.9%/>99.9% | NW > 99.9%/>99.9% |
| 50 Min | NW > 99.9%/>99.9% | NW > 99.9%/>99.9% | NW > 99.9%/>99.9% |
| 60 Min | NW > 99.9%/>99.9% | NW > 99.9%/>99.9% | NW > 99.9%/>99.9% |

| Dust remove rate | 1 um | 2.5 um |
|---|---|---|
| 10 Min | NW 94.7%/89.4% | NW 94.7%/90.7% |
| 20 Min | NW 99.8%/98.2% | NW 99.8%/99.1% |
| 30 Min | NW > 99.9%/>99.9% | NW > 99.9%/>99.9% |
| 40 Min | NW > 99.9%/>99.9% | NW > 99.9%/>99.9% |
| 50 Min | NW > 99.9%/>99.9% | NW > 99.9%/>99.9% |
| 60 Min | NW > 99.9%/>99.9% | NW > 99.9%/>99.9% |

As can be seen in TABLE 7, the two systems are basically identical in the removal of dust particles of each size after 30 minutes. However the present system 10 is significantly more effective after only 10 minutes of operation.

Independent testing (at 120V/60 Hz) of prior art air purifiers for dust, smoke and formaldehyde removal are summarized in data TABLES 8-16 below. Similar independent testing data from the air purifier of the present disclosure is set forth in TABLES 17, 18A and 18B, and 19-21.

Table 8 shows independent testing data on pollutant (i.e., formaldehyde, smoke and dust) removal using a prior art air purifier.

TABLE 8

| | Fan speed: High speed | | | |
|---|---|---|---|---|
| | | | Smoke | |
| | Formaldehyde | 0.09 μm | 0.1 μm | 0.2 μm |
| 10 Min | 1.8182% | 70.9309% | 73.8725% | 86.3492% |
| 20 Min | 2.7273% | 95.1837% | 95.5471% | 98.7302% |
| 30 Min | 6.3636% | 99.3528% | 99.2008% | 100.0000% |

TABLE 8-continued

| 40 Min | 5.4545% | 99.9048% | 99.9239% | 100.0000% |
| 50 Min | 7.2727% | 99.9619% | 99.9619% | 100.0000% |
| 60 Min | 9.0909% | 99.9810% | 100.0000% | 100.0000% |
| 70 Min | 10.0000% | — | — | — |
| 80 Min | 11.8182% | — | — | — |
| 90 Min | 12.7273% | — | — | — |
| 100 Min | 14.5455% | — | — | — |
| 110 Min | 15.4545% | — | — | — |
| 120 Min | 16.3636% | — | — | — |

TABLE 8-continued

| | Fan speed: | | |
|---|---|---|---|
| | | Dust | |
| | 0.5 μm | 1 μm | 2.5 μm |
| 10 Min | 84.3055% | 83.9062% | 89.0756% |
| 20 Min | 97.7778% | 97.5409% | 100.0000% |
| 30 Min | 99.5278% | 99.6137% | 100.0000% |
| 40 Min | 99.9167% | 99.8970% | 100.0000% |
| 50 Min | 99.9444% | 99.9228% | 100.0000% |
| 60 Min | 99.9167% | 99.8326% | 100.0000% |
| 70 Min | — | — | — |
| 80 Min | — | — | — |
| 90 Min | — | — | — |
| 100 Min | — | — | — |
| 110 Min | — | — | — |
| 120 Min | — | — | — |

As shown in TABLE 8, while the system is effective at removing nearly 100% of all smoke and dust particles after one hour, the reduction in formaldehyde is only 16.36% after two hours.

Table 9 shows independent testing data on pollutant (i.e., formaldehyde, smoke and dust) removal using a prior art air purifier.

TABLE 9

| | Fan speed: Turbo speed | | | |
|---|---|---|---|---|
| | Formaldehyde | 0.09 μm | Smoke 0.1 μm | 0.2 μm |
| 10 Min | 5.8252% | 65.2823% | 66.1404% | 65.3571% |
| 20 Min | 11.6505% | 99.7045% | 99.6842% | 100.0000% |
| 30 Min | 16.5049% | 99.9836% | 100.0000% | 100.0000% |
| 40 Min | 24.2718% | 99.9836% | 100.0000% | 100.0000% |
| 50 Min | 30.0971% | 100.0000% | 99.8327% | 99.9178% |
| 60 Min | 35.9223% | 100.0000% | 100.0000% | 100.0000% |
| 70 Min | 39.8058% | — | — | — |
| 80 Min | 43.6893% | — | — | — |
| 90 Min | 48.5437% | — | — | — |
| 100 Min | 52.4272% | | | |
| 110 Min | 54.3689% | — | — | — |
| 120 Min | 59.2233% | — | — | — |

| | Fan speed: | | |
|---|---|---|---|
| | | Dust | |
| | 0.5 μm | 1 μm | 2.5 μm |
| 10 Min | 82.5694% | 82.9028% | 92.8000% |
| 20 Min | 97.7919% | 98.0977% | 99.2000% |
| 30 Min | 99.7658% | 99.7769% | 99.2000% |
| 40 Min | 99.8996% | 99.9061% | 99.2000% |
| 50 Min | | | |
| 60 Min | 99.8996% | 99.9648% | 99.2000% |
| 70 Min | — | — | — |
| 80 Min | — | — | — |
| 90 Min | — | — | — |
| 100 Min | | | |
| 110 Min | — | — | — |
| 120 Min | — | — | — |

As shown in TABLE 9, while the system is effective at removing nearly 100% of all smoke and dust particles after one hour, the reduction in formaldehyde is only 59.22% after two hours.

Table 10 shows independent testing data on pollutant (i.e., formaldehyde, smoke and dust) removal using a prior art air purifier.

TABLE 10

| | Fan speed: High speed | | | |
|---|---|---|---|---|
| | Formaldehyde | 0.09 μm | Smoke 0.1 μm | 0.2 μm |
| 10 Min | 26.3636% | 90.5927% | 91.6563% | 96.3158% |
| 20 Min | 40.0000% | 99.6791% | 99.7919% | 100.0000% |
| 30 Min | 59.0909% | 100.0000% | 99.9688% | 100.0000% |
| 40 Min | 64.5455% | 100.0000% | 99.9792% | 100.0000% |
| 50 Min | 75.4545% | 100.0000% | 99.9896% | 100.0000% |
| 60 Min | 80.9091% | 100.0000% | 100.0000% | 100.0000% |
| 70 Min | 87.2727% | — | — | — |
| 80 Min | 89.0909% | — | — | — |
| 90 Min | 91.8182% | | | |
| 100 Min | 92.7273% | | | |
| 110 Min | 94.5455% | — | — | — |
| 120 Min | 95.4545% | — | — | — |

| | Fan speed: | | |
|---|---|---|---|
| | | Dust | |
| | 0.5 μm | 1 μm | 2.5 μm |
| 10 Min | 76.0775% | 77.8015% | 90.0000% |
| 20 Min | 95.0862% | 95.9561% | 98.8889% |
| 30 Min | 98.8793% | 99.2169% | 100.0000% |
| 40 Min | 99.7414% | 99.7722% | 100.0000% |
| 50 Min | 99.9569% | 99.7864% | 100.0000% |
| 60 Min | 99.9569% | 99.8718% | 100.0000% |
| 70 Min | — | — | — |
| 80 Min | — | — | — |
| 90 Min | — | — | — |
| 100 Min | | | |
| 110 Min | — | — | — |
| 120 Min | — | — | — |

As shown in TABLE 10, while the system is effective at removing nearly 100% of all smoke and dust particles after one hour, the reduction in formaldehyde is only 95.45% after two hours.

Table 11 shows independent testing data on pollutant (i.e., formaldehyde, smoke and dust) removal using a prior art air purifier.

TABLE 11

| | Fan speed: Turbo speed | | | |
|---|---|---|---|---|
| | Formaldehyde | 0.09 μm | Smoke 0.1 μm | 0.2 μm |
| 10 Min | 1.8018% | 89.6113% | 90.4882% | 96.2609% |
| 20 Min | 2.7027% | 99.5681% | 99.5841% | 99.9130% |
| 30 Min | 3.6036% | 99.9773% | 99.9781% | 100.0000% |
| 40 Min | 5.4054% | 99.9773% | 100.0000% | 100.0000% |
| 50 Min | 6.3063% | 99.9886% | 100.0000% | 100.0000% |
| 60 Min | 7.2072% | 100.0000% | 100.0000% | 100.0000% |
| 70 Min | 9.0090% | — | — | — |
| 80 Min | 9.9099% | — | — | — |
| 90 Min | 10.8108% | — | — | — |
| 100 Min | 11.7117% | | | |
| 110 Min | 12.6126% | — | — | — |
| 120 Min | 13.5135% | — | — | — |

| | Fan speed: | | |
|---|---|---|---|
| | | Dust | |
| | 0.5 μm | 1 μm | 2.5 μm |
| 10 Min | 90.5499% | 89.4389% | 95.2830% |
| 20 Min | 99.5061% | 99.5915% | 100.0000% |
| 30 Min | 99.9671% | 99.9519% | 100.0000% |
| 40 Min | 99.9671% | 99.9640% | 100.0000% |
| 50 Min | 99.9671% | 99.9640% | 100.0000% |
| 60 Min | 99.9671% | 99.9880% | 100.0000% |
| 70 Min | — | — | — |
| 80 Min | — | — | — |

TABLE 11-continued

| | | | |
|---|---|---|---|
| 90 Min | — | — | — |
| 100 Min | — | — | — |
| 110 Min | — | — | — |
| 120 Min | — | — | — |

As shown in TABLE 11, while the system is effective at removing nearly 100% of all smoke and dust particles after one hour, the reduction in formaldehyde is only 13.51% after two hours.

Table 12 shows independent testing data on pollutant (i.e., formaldehyde, smoke and dust) removal using a prior art air purifier.

TABLE 12

Fan speed: High speed

| | Formaldehyde | 0.09 μm | Smoke 0.1 μm | 0.2 μm |
|---|---|---|---|---|
| 10 Min | 42.5926% | 45.5798% | 48.4654% | 76.2677% |
| 20 Min | 61.1111% | 78.5434% | 80.1551% | 95.2333% |
| 30 Min | 68.5185% | 92.2353% | 93.4404% | 98.4787% |
| 40 Min | 76.8519% | 97.3557% | 98.0942% | 99.3915% |
| 50 Min | 82.4074% | 99.2941% | 99.5235% | 100.0000% |
| 60 Min | 85.1852% | 99.8319% | 99.8670% | 100.0000% |
| 70 Min | 86.1111% | — | — | — |
| 80 Min | 87.9630% | — | — | — |
| 90 Min | 88.8889% | — | — | — |
| 100 Min | 90.7407% | | | |
| 110 Min | 91.6667% | — | — | — |
| 120 Min | 92.5926% | — | — | — |

Fan speed:

| | 0.5 μm | Dust 1 μm | 2.5 μm |
|---|---|---|---|
| 10 Min | 76.0775% | 77.8015% | 90.0000% |
| 20 Min | 95.0862% | 95.9561% | 98.8889% |
| 30 Min | 98.8793% | 99.2169% | 100.0000% |
| 40 Min | 99.7414% | 99.7722% | 100.0000% |
| 50 Min | 99.9569% | 99.7864% | 100.0000% |
| 60 Min | 99.9569% | 99.8718% | 100.0000% |
| 70 Min | — | — | — |
| 80 Min | — | — | — |
| 90 Min | — | — | — |
| 100 Min | | | |
| 110 Min | — | — | — |
| 120 Min | — | — | — |

As shown in TABLE 12, while the system is effective at removing nearly 100% of all smoke and dust particles after one hour, the reduction in formaldehyde is only 92.59% after two hours.

Table 13 shows independent testing data on pollutant (i.e., formaldehyde, smoke and dust) removal using a prior art air purifier.

TABLE 13

Fan speed: High speed

| | Formaldehyde | 0.09 μm | Smoke 0.1 μm | 0.2 μm |
|---|---|---|---|---|
| 10 Min | 1.7699% | 90.3622% | 91.1389% | 96.0707% |
| 20 Min | 5.3097% | 99.6220% | 99.7135% | 99.9018% |
| 30 Min | 7.0796% | 99.9790% | 99.9693% | 100.0000% |
| 40 Min | 8.8496% | 99.9895% | 100.0000 | 100.0000% |
| 50 Min | 11.5044% | 100.0000% | 100.0000% | 100.0000% |
| 60 Min | 13.2743% | 100.0000% | 100.0000% | 100.0000% |
| 70 Min | 14.1593% | — | — | — |
| 80 Min | 15.9292% | — | — | — |
| 90 Min | 17.6991% | — | — | — |
| 100 Min | 21.2389% | | | |
| 110 Min | 24.7788% | — | — | — |
| 120 Min | 28.3186% | — | — | — |

Fan speed:

| | 0.5 μm | Dust 1 μm | 2.5 μm |
|---|---|---|---|
| 10 Min | 90.2455% | 89.1951% | 95.3271% |
| 20 Min | 99.6447% | 99.5712% | 99.0654% |
| 30 Min | 99.9031% | 99.9265% | 99.0654% |
| 40 Min | 99.9031% | 99.9510% | 100.0000% |
| 50 Min | 99.9031% | 99.9632% | 100.0000% |
| 60 Min | 99.9677% | 99.9632% | 100.0000% |
| 70 Min | — | — | — |
| 80 Min | — | — | — |
| 90 Min | — | — | — |
| 100 Min | | | |
| 110 Min | — | — | — |
| 120 Min | — | — | — |

As shown in TABLE 13, while the system is effective at removing nearly 100% of all smoke and dust particles after one hour, the reduction in formaldehyde is only 28.32% after two hours.

Table 14 shows independent testing data on pollutant (i.e., formaldehyde, smoke and dust) removal using a prior art air purifier.

TABLE 14

Fan speed: High speed

| | Formaldehyde | 0.09 μm | Smoke 0.1 μm | 0.2 μm |
|---|---|---|---|---|
| 10 Min | 35.6522% | 87.9292% | 89.4021% | 95.1485% |
| 20 Min | 55.6522% | 99.0625% | 99.4607% | 99.8020% |
| 30 Min | 63.4783% | 99.9766% | 99.9883% | 100.0000% |
| 40 Min | 66.0870% | 99.9766% | 100.0000% | 100.0000% |
| 50 Min | 71.3043% | 100.0000% | 100.0000% | 100.0000% |
| 60 Min | 76.5217% | 100.0000% | 100.0000% | 100.0000% |
| 70 Min | 77.3913% | — | — | — |
| 80 Min | 79.1304% | — | — | — |
| 90 Min | 80.0000% | — | — | — |
| 100 Min | 81.7391% | | | |
| 110 Min | 82.6087% | — | — | — |
| 120 Min | 83.4783% | — | — | — |

Fan speed:

| | 0.5 μm | Dust 1 μm | 2.5 μm |
|---|---|---|---|
| 10 Min | 91.9304% | 92.0667% | 95.2756% |
| 20 Min | 99.4620% | 99.4360% | 99.2126% |
| 30 Min | 99.9367% | 99.8371% | 100.0000% |
| 40 Min | 99.9684% | 99.9499% | 100.0000% |
| 50 Min | 99.9684% | 99.9624% | 100.0000% |
| 60 Min | 99.9684% | 99.9624% | 100.0000% |
| 70 Min | — | — | — |
| 80 Min | — | — | — |
| 90 Min | — | — | — |
| 100 Min | | | |
| 110 Min | — | — | — |
| 120 Min | — | — | — |

As shown in TABLE 14, while the system is effective at removing nearly 100% of all smoke and dust particles after one hour, the reduction in formaldehyde is only 83.48% after two hours.

Table 15 shows independent testing data on pollutant (i.e., formaldehyde, smoke and dust) removal using a prior art air purifier.

TABLE 15

| | Fan speed: High speed | | | |
|---|---|---|---|---|
| | Formaldehyde | 0.09 μm | Smoke 0.1 μm | 0.2 μm |
| 10 Min | 4.7619% | 75.3306% | 77.7331% | 89.0694% |
| 20 Min | 8.5714% | 98.3717% | 98.5391% | 99.4830% |
| 30 Min | 12.3810% | 99.8898% | 99.8783% | 100.0000% |
| 40 Min | 15.2381% | 99.9755% | 100.0000% | 100.0000% |
| 50 Min | 17.1429% | 99.9755% | 100.0000% | 100.0000% |
| 60 Min | 18.0952% | 100.0000% | 100.0000% | 100.0000% |
| 70 Min | 19.0476% | — | — | — |
| 80 Min | 20.9524% | — | — | — |
| 90 Min | 21.9048% | — | — | — |
| 100 Min | 23.8095% | — | — | — |
| 110 Min | 25.7143% | — | — | — |
| 120 Min | 26.6667% | — | — | — |

| | Fan speed: | | |
|---|---|---|---|
| | 0.5 μm | Dust 1 μm | 2.5 μm |
| 10 Min | 91.2338% | 90.1785% | 91.6667% |
| 20 Min | 99.4481% | 99.2910% | 100.0000% |
| 30 Min | 99.9351% | 99.8818% | 100.0000% |
| 40 Min | 99.9351% | 99.8818% | 100.0000% |
| 50 Min | 98.8701% | 99.9343% | 100.0000% |
| 60 Min | 99.8701% | 99.9343% | 100.0000% |
| 70 Min | — | — | — |
| 80 Min | — | — | — |
| 90 Min | — | — | — |
| 100 Min | — | — | — |
| 110 Min | — | — | — |
| 120 Min | — | — | — |

As shown in TABLE 15, while the system is effective at removing nearly 100% of all smoke and dust particles after one hour, the reduction in formaldehyde is only 26.67% after two hours.

Table 16 shows independent testing data on pollutant (i.e., formaldehyde, smoke and dust) removal using a prior art air purifier.

TABLE 16

| | Fan speed: High speed | | | |
|---|---|---|---|---|
| | Formaldehyde | 0.09 μm | Smoke 0.1 μm | 0.2 μm |
| 10 Min | 42.4779% | 70.3469% | 71.1217% | 85.1043% |
| 20 Min | 54.8673% | 96.2873% | 96.4937% | 98.3118% |
| 30 Min | 57.5221% | 99.5420% | 99.6838% | 100.0000% |
| 40 Min | 65.4867% | 99.9610% | 99.9628% | 100.0000% |
| 50 Min | 68.1416% | 99.9805% | 99.9721% | 100.0000% |
| 60 Min | 70.7965% | 100.0000% | 99.9907% | 100.0000% |
| 70 Min | 73.4513% | — | — | — |
| 80 Min | 76.1062% | — | — | — |
| 90 Min | 76.9912% | — | — | — |
| 100 Min | 78.7611% | — | — | — |
| 110 Min | 79.6460% | — | — | — |
| 120 Min | 83.1858% | — | — | — |

| | Fan speed: | | |
|---|---|---|---|
| | 0.5 μm | Dust 1 μm | 2.5 μm |
| 10 Min | 87.3281% | 87.1547% | 95.0820% |
| 20 Min | 98.6250% | 98.4274% | 99.1803% |
| 30 Min | 99.6284% | 99.7357% | 99.1803% |
| 40 Min | 99.8514% | 99.8943% | 99.1803% |
| 50 Min | 100.0000% | 99.9604% | 100.0000% |
| 60 Min | 100.0000% | 99.9604% | 100.0000% |
| 70 Min | — | — | — |
| 80 Min | — | — | — |

TABLE 16-continued

| 90 Min | — | — | — |
|---|---|---|---|
| 100 Min | — | — | — |
| 110 Min | — | — | — |
| 120 Min | — | — | — |

As shown in TABLE 16, while the system is effective at removing 100% of all smoke and dust particles after one hour, the reduction in formaldehyde is only 83.19% after two hours.

Table 17 shows independent testing data on pollutant (i.e., formaldehyde) removal using an air purifier of the present disclosure.

TABLE 17

Nuwave OxyPure Air Purifier, Model No. 470xx

Test voltage: 120 V/60 Hz

Fan speed: High speed

| Time Period | Formaldehyde |
|---|---|
| 10 Min | 52.3364% |
| 20 Min | 79.4393% |
| 30 Min | 84.1121% |
| 40 Min | 85.9813% |
| 50 Min | 87.8505% |
| 60 Min | 88.7850% |
| 70 Min | 90.6542% |
| 80 Min | 91.5888% |
| 90 Min | 92.5234% |
| 100 Min | 93.4579% |
| 110 Min | 94.3925% |
| 120 Min | 95.3271% |

As shown in TABLE 17, the present invention is capable of removing 95.33% of air borne formaldehyde after two hours. This is a significant improvement over each of the tested prior art air purifying systems.

Tables 18A and 18B show independent testing data on pollutant (i.e., smoke) removal using the present system 10 (e.g., Nuwave OxyPure Air Purifier, Model No. 470xx).

TABLE 18A

| | 0.09 μm | 0.1 μm | 0.11 μm | 0.12 μm |
|---|---|---|---|---|
| 10 Min | 94.5629% | 95.0095% | 95.6727% | 96.4064% |
| 20 Min | 99.9424% | 99.9141% | 99.9204% | 99.9251% |
| 30 Min | 100.0000% | 99.9905% | 99.9901% | 99.9942% |
| 40 Min | 100.0000% | 99.9905% | 100.0000% | 100.0000% |
| 50 Min | 100.0000% | 99.9905% | 100.0000% | 100.0000% |
| 60 Min | 100.0000% | 100.0000% | 100.0000% | 100.0000% |

TABLE 18B

| | 0.13 μm | 0.14 μm | Smoke 0.15 μm | 0.16 μm | 017 μm |
|---|---|---|---|---|---|
| 10 Min | 96.8027% | 97.0656% | 97.5859% | 97.6454% | 97.7987% |
| 20 Min | 99.9159% | 99.9632% | 99.9368% | 99.9822% | 99.9738% |
| 30 Min | 99.9860% | 100.0000% | 100.0000% | 99.9822% | 100.0000% |
| 40 Min | 99.9930% | 100.0000% | 100.0000% | 100.0000% | 100.0000% |
| 50 Min | 100.0000% | 100.0000% | 100.0000% | 100.0000% | 100.0000% |
| 60 Min | 100.0000% | 100.0000% | 100.0000% | 100.0000% | 100.0000% |

As shown in TABLES 18A and 18B, the system 10 is capable of removing 100% of smoke particles in less than one hour.

Table 19 shows independent testing data on bacteria (*Escherichia coli*) removal using three air purifiers of the present disclosure.

TABLE 19

| Action Time (hr) | The tested organism | Serial Number | The number of Bacteria in the air(CFU/m$^3$) | Reduced rate (%) |
|---|---|---|---|---|
| *0(CK) | *Escherichia coli* 8099 | 1 | 5.4 × 10$^4$ | / |
| | | 2 | 5.5 × 10$^4$ | / |
| | | 3 | 5.6 × 10$^4$ | / |
| *2 h | *Escherichia coli* 8099 | 1 | 1.6 × 10$^2$ | 99.21 |
| | | 2 | 1.3 × 10$^2$ | 99.35 |
| | | 3 | 1.3 × 10$^2$ | 99.36 |
| | | Average | | 99.31 |

As shown in TABLE 19, the present system 10 is capable of removing 99.31% of bacteria in two hours.

Table 20 shows independent testing data on three different micro-organisms (*Staphylococcus albus*, *Staphylococcus aureus*, and *Aspergillus niger*) removal using three air purifiers of the present disclosure.

TABLE 20

| Action Time (hr) | Virus and Host Cell | Data Point | Air Virus Content (TCID$_{50}$/m3) | Removal Rate (%) |
|---|---|---|---|---|
| *1 h | H3N2 Influenza virus Host cell MDCK | Before test | 7.19 × 10$^5$ | / |
| | | After test | 7.27 × 10$^2$ | 99.68 |

| Action Time (hr) | The tested organism | Serial Number | The number of Bacteria in the air (cfu$_0$/m3) | Reduced rate (%) |
|---|---|---|---|---|
| *0(CK) | *Staphylococcus albus* 8032 | 1 | 5.6 × 10$^4$ | / |
| | | 2 | 5.9 × 10$^4$ | / |
| | | 3 | 5.8 × 10$^4$ | / |
| *2 h | *Staphylococcus albus* 8032 | 1 | 92 | 99.54 |
| | | 2 | 85 | 99.57 |
| | | 3 | 64 | 99.69 |
| | | Average | | 99.60 |
| *0(CK) | *Staphylococcus aureus* ATCC 6538 | 1 | 5.8 × 10$^4$ | / |
| | | 2 | 6.0 × 10$^4$ | / |
| | | 3 | 5.9 × 10$^4$ | / |
| *2 h | *Staphylococcus aureus* ATCC 6538 | 1 | 85 | 99.60 |
| | | 2 | 56 | 99.73 |
| | | 3 | 92 | 99.53 |
| | | Average | | 99.62 |
| *0(CK) | *Aspergillus niger* ATCC 16404 | 1 | 5.4 × 10$^4$ | / |
| | | 2 | 5.4 × 10$^4$ | / |
| | | 3 | 5.5 × 10$^4$ | / |
| *2 h | *Aspergillus niger* ATCC 16404 | 1 | 35 | 99.80 |
| | | 2 | 28 | 99.84 |
| | | 3 | 28 | 99.83 |
| | | Average | | 99.82 |

As shown in TABLE 20, the present system 10 is capable of removing over 99.6% of each of the three micro-organisms (*Staphylococcus albus*, *Staphylococcus aureus*, and *Aspergillus niger*) after only two hours.

Table 21 shows the average clean air delivery rates (CADR) for three systems 10 after independent testing using micro-particles (i.e., pollen, smoke and dust).

TABLE 21

| Model/Configuration | Test Particulate | Natural Decay Rate | CADR (FT$^3$/Min) |
|---|---|---|---|
| S180528107-001, 120 V/60 Hz High Speed | Smoke | 0.00490 | 352.9 |
| | Dust | 0.01148 | 344.9 |
| | Pollen | 0.15168 | 391.7 |
| S180528107-002, 120 V/60 Hz High Speed | Smoke | 0.00426 | 340.4 |
| | Dust | 0.01063 | 323.4 |
| | Pollen | 0.13759 | 352.5 |
| S180528107-003, 120 V/60 Hz High Speed | Smoke | 0.00477 | 371.5 |
| | Dust | 0.01521 | 330.0 |
| | Pollen | 0.16263 | 343.6 |

| Average CADR value of three test units | | |
|---|---|---|
| CADR (FT$^3$/Min) | | |
| Smoke | Dust | Pollen |
| 354.9 | 332.8 | 362.6 |

| Model/Configuration | Test Particulate | CADR STDEV | Power (Watts) |
|---|---|---|---|
| S180528107-001, 120 V/60 Hz High Speed | Smoke | 4.2 | 131.1 |
| | Dust | 2.7 | 129.9 |
| | Pollen | 16.5 | 128.2 |
| S180528107-002, 120 V/60 Hz High Speed | Smoke | 5.2 | 131.4 |
| | Dust | 1.9 | 132.1 |
| | Pollen | 17.2 | 132.7 |
| S180528107-003, 120 V/60 Hz High Speed | Smoke | 4.4 | 129.5 |
| | Dust | 2.4 | 128.4 |
| | Pollen | 10.7 | 125.8 |

| Average CADR value of three test units | | |
|---|---|---|
| CADR (FT$^3$/Min) | | |
| Smoke | Dust | Pollen |
| 354.9 | 332.8 | 362.6 |

As shown in TABLE 21, the CADR for the present system 10 is 354.9 ft$^3$/min for smoke particle removal, 332.8 ft$^3$/min for dust removal, and 362.6 ft$^3$/min for pollen removal.

Operation of Air Filter System

Returning to FIG. 4B, the system 10 can be operated from the control panel 14. Each of the buttons 50 is backlit to illuminate when the button is pushed and will remain lit while the related function is operating. When pushing any button 50, the system 10 will emit a single beep. When the selected function is complete, a single long beep (200 ms) will be emitted.

The system 10 can be turned on by depressing "Power" button 51. A beep will sound when the system 10 activates. However, when the system 10 is initially plugged into a power source, the unit goes into standby mode. When off, the "Power" button 51 is lit with a red color, which turns to green when the system 10 is turned on. During operation, the DUST & ODOR LED is lit. The following is a list of preprogrammed functions and modes for the system 10.

Reset WIFI connection: press the "Power" button 51 for three seconds;

Place system 10 in "Sleep Mode": press the "Fan Speed" button 53 for two seconds;

Reset the Dust (clean filter) time sequence: press "Timer" button 54 for two seconds. For example, when a filter 60 is removed and cleaned, performing this step will reset the time frame for the Dust Filter approximately six months.

Reset the Formaldehyde (replace filter) time sequence: press "Turbo" button 55 for two seconds. For example, when you replace a filter 60 for odor, performing this step will reset the time frame for the catalyst filter 66—approximately five years.

If a user has chosen any mode to run the unit, after power off and then power on, the unit will run the same mode as last time.

Preferably, the default upon power up will go into a low fan speed mode. While ON, operation of the system 10 can be changed as follows: Pressing "Timer" button 54 once will be for 30 minutes of operation; twice for 1 hr; three times for 2 hours, etc. Likewise, pressing the "Fan Speed" button 53 will increase fan speed by one increment (e.g., levels 1-10 or low/medium/high). Pressing "Ultimate Clean" button 58 will clean at the highest fan speed until turned off. Pressing "Auto" button 52 will clean air at varying fan speeds, due to different dust and odors, until turned off. Pressing "Turbo" button 55 once will operate for 30 minutes; twice for 1 hr; three times for 2 hours, etc. If no other button 50 is pressed after the "Turbo" button 55, then the system 10 will turn OFF after the selected time.

Pressing the "Auto" button 52 runs the system 10 automatically according to current air quality. AUTO mode backlight is off when the unit is not in AUTO mode. Pressing the "Auto" button 52 will turn the backlight on. The system 10 will operate automatically and continuously according to current air quality conditions. Fan speed is automatically adjusted according to the changing air quality. For example, if the air quality is poor, the fan speed will increase. But, as the air quality improves (i.e., becomes fair to good), the fan speed will slow. Fan speed will vary automatically according to air quality.

The "AUTO" function and "FAN SPEED" button cannot work together. That is, while in AUTO mode, if the "FAN SPEED" button 53 is pressed, the AUTO function will turn off (manual fan speed mode). While the unit is running in AUTO mode, the user can adjust operation time by pressing the "TIMER" button 54. Conversely, while on manual fan speed, pressing the "Auto" button 52 will change to AUTO mode.

The "AUTO" mode and "ULTIMATE CLEAN" button 58 can work together. Even if the unit is turned OFF and a user presses the "Auto" button 52, then the system 10 will automatically turn on and go into AUTO mode. It will clean (Fan speed will change due to changing air conditions from dust, particles and odors in an area) until turned off.

The "Ultimate Clean" mode runs the system 10 at the highest fan speed while air quality is poor (e.g., parts per million at 2.5 μm is over 10: PM2.5>10). Even if the unit is turned OFF (Power OFF), and the user presses "Ultimate Clean" button 58, the system 10 will clean at a determined fan speed until turned off.

Ultimate clean mode can work together with AUTO mode. When both AUTO mode and ULTIMATE CLEAN mode are selected, the system 10 will run in ULTIMATE CLEAN mode initially. However, after the air quality condition improve (e.g., PM2.5<10), the system 10 goes into AUTO mode.

Further, ULTIMATE CLEAN mode can work together with TURBO mode. When both "Turbo" button 55 and "Ultimate Clean" button 58 are pushed, the system 10 will run TURBO mode for about 30 minutes, then go into ULTIMATE CLEAN mode.

The "Turbo" button 55 causes the system to run with highest fan speed for a specific time: e.g., half hour, 1 hour, or 2 hours. Even if the unit is OFF, pressing the Turbo button 55 once, the system 10 will operate for 30 minutes; twice extends operation to 1 hour; and three times will operate the system 10 for 2 hours. If no other button is pressed after the "Turbo" button 55, then the system 10 will turn OFF after the selected time. The default fan speed for TURBO mode is about 1030 RPM.

TURBO mode can work with AUTO. By pressing the "Turbo" button 55 twice and then the "Auto" button 52, the system 10 will go into TURBO mode for one hour then AUTO mode until turned off.

The "Fan Speed" button 53 adjusts fan speed. Preferably there are six fan speed levels. Even if the system 10 is OFF (Power OFF), pressing the "Fan Speed" button 53 will turn the system 10 on with a low fan speed. Pressing the "Fan Speed" button 53 once will display one bar on the panel 14, twice will light two bars, etc., until the 7th time, it will return to the lowest speed level. The preferred fan speed levels are 400 RPM, 526 RPM, 652 RPM, 778 RPM, 904 RPM, and 1030 RPM.

The "Timer" button 54 adjusts the time of operation. The six preferred time increments are 30 mins, 60 mins, 120 mins, 240 mins, 480 mins, and 720 mins. Even if the system 10 is OFF, pressing the "Timer" button 54 will go into default for 30 minutes at a low fan speed (lowest level). Pressing the "Timer" button 54 will cause the backlight to illuminate. Similar to the fan, pressing the "Timer" button 54 once will light a first bar on the control panel 14, a second press will light a second bar, etc. until the 7th press which will turn off the TIMER and all associated backlight will be turned off as well.

The control panel 14 includes several indication features on the display. An "Air Quality" indicator is included on the display. The indication light for this feature will turn on as soon as the unit is turned on. Based on the various sensor readings, one of six air quality levels will be indicated: clean (green) to poor (red). The system 10 will display the air quality of the incoming air according to current air quality measurements.

Also, there is a "CLEAN FILTER" indication LED. This LED indicator will turn off when the filter is clean (e.g., under 3 months of use). The LED indicator will turn blue after a period of time (e.g., after 3 months of use), letting a user know to clean the filters. If the filters are not cleaned and the indicator reset, the LED indicator will turn red (e.g., after 6 months of use). Preferably, the time of use (e.g., 3 or 6 months) is accumulated by working hours. To clear previous use ti: reset sensor), press "Timer" button 54 for 2 seconds until beep sounds when the system is turned off.

An ODOR indication light turns on as soon as the unit is operated. There are preferably six levels of air quality indication from NO ODOR (green) to STRONG ODOR (red). The control panel 14 will display "odor indication bars" according to the current odor measurement.

There is also a light indicator next to "clean" that is below the "Odor indicator". When a filter needs to be replaced, the light will turn red (approximately 5 years).

To reset the filter timer, press the "Turbo" button 55 for two seconds while the system 10 is ON. When a beep sounds the timer is reset for another, e.g., 5 years.

When air quality regarding odor is poor (highest level, red bar), an alarm beep will be triggered. At the same time, the LED indicator bars for odor will start blinking. A user may turn off the alarm (blinking and beep sound) by pressing "Auto" button 52 and "Fan Speed" button 53 together.

A WIFI indication light can also be found on the display of the control panel 14. To activate, the "Power" button 51 is pressed and held for up to three seconds until a beep sounds and a dot next to the WIFI indication is flashing at the same time. As soon as the WIFI is connected, the LED indicator light will light up solid. To turn off WIFI, pressing and holding the "Power" button 51 while the system 10 is ON, for up to 3 seconds until the beep sounds, the WIFI will be disconnected and the LED indicator light will be turned off. If there is no WIFI available, after 10 seconds, the LED indicator light turns off.

An LED brightness adjustment is defaulted to 100% power. After about 30 seconds without any button pushing, the LED light will be turned down to about 30% power automatically. Once a button is touched, the LED will go back to 100% power. When the system 10 is working, the LED lights can be completely turned off (0% power) by pressing and holding the "FAN SPEED" button 53 for at least two seconds.

Pressing the "Power" button 51 and the "Ultimate Clean" button 58 together at anytime will place the system 10 into an automatic on/off mode. That is, when the air quality is poor, the system 10 will turn on automatically and run in AUTO mode. The LEDs corresponding to Power and AUTO mode will be lit during this time. When the air quality is good, the unit will turn off automatically. The LED for Power will be illuminated (e.g., green) while the LED for AUTO mode will be off. To stop the automatic on/off mode, the "Power" button 51 and the "Ultimate Clean" button 58 must be pressed together again. The LED for Power will be turned to red.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. An air purifying system comprising:
   an outer housing having a base portion, a middle section, and an upper surface;
   a control panel positioned on the upper surface, an air inlet positioned within the base portion, and an air outlet positioned within the upper surface;
   an air quality sensor coupled to the control panel and positioned proximate the air inlet;
   a filter chamber positioned within the middle section of the outer housing, above the air inlet and below the control panel and air outlet, the filter chamber comprising a series of filters arranged in a vertical stack; and
   a fan positioned within the outer housing above the filter chamber, electrically coupled to the control panel and configured to draw air through the air inlet, into the filter chamber, upward through the series of filters, and then push the air out through the air outlet, a speed of the fan being responsive to the air quality sensor;
   wherein the series of filters comprises at least one of each of the following filters:
      a pre-filter,
      a HEPA electrostatic filter,
      an activated carbon filter, and
      a cold catalyst filter wherein the air inlet comprises air openings for about 360° about the base of the housing and the pre-filter, HEPA electrostatic filter, cold catalyst filter, and activated carbon filter are stacked in order from bottom to top in the filter chamber.

2. The air purifying system of claim 1, wherein over 99% of airborne dust particles, smoke particles and VOCs are removed from air moving through the series of filters.

3. The air purifying system of claim 1, wherein over 99% of airborne dust particles, smoke particles and VOCs are removed from air moving through the series of filters.

4. The air purifying system of claim 1, wherein the series of filters are removable.

5. The air purifying system of claim 1, further comprising an air quality indicator on the control panel, wherein the air quality indicator is responsive to the air quality sensor.

6. The air purifying system of claim 5, wherein the air quality indicator is a variable light display.

7. The air purifying system of claim 1, further comprising a filter use timer which records time of use of the system.

8. The air purifying system of claim 7, further comprising an alert coupled to the filter use timer.

9. The air purifying system of claim 8, wherein the alert is an audible sound.

10. The air purifying system of claim 8, wherein the alert is visual.

11. The air purifying system of claim 1, wherein the HEPA electrostatic filter is electronically coupled to the control panel.

12. The air purifying system of claim 1, wherein the HEPA electrostatic filter comprises a plurality of closely arranged charged plates.

13. The air purifying system of claim 1, wherein the HEPA electrostatic filter can be rinsed clean.

* * * * *